(12) United States Patent
Santos et al.

(10) Patent No.: US 8,908,904 B2
(45) Date of Patent: Dec. 9, 2014

(54) METHOD AND SYSTEM FOR MAKE-UP SIMULATION ON PORTABLE DEVICES HAVING DIGITAL CAMERAS

(75) Inventors: Eduardo Telmo Fonseca Santos, Salvador (BR); Eduardo Manuel de Freitas Jorge, Salvador (BR); Vanessa Santos Medina, Salvador (BR); Fernando Campos Martins, Salvador (BR); Ana Lucia Lage Pereira, Salvador (BR); Gustavo de Almeida Neves, Salvador (BR); Luciano Rebouças de Oliveira, Salvador (BR)

(73) Assignee: Samsung Electrônica da Amazônia Ltda., Campinas-São Paulo (BR)

( * ) Notice: Subject to any disclaimer, the term of this patent is extended or adjusted under 35 U.S.C. 154(b) by 40 days.

(21) Appl. No.: 13/338,554

(22) Filed: Dec. 28, 2011

(65) Prior Publication Data

US 2013/0169827 A1 Jul. 4, 2013

(51) Int. Cl.
*G06K 9/00* (2006.01)

(52) U.S. Cl.
USPC .......................................... 382/100; 382/118

(58) Field of Classification Search
USPC ................................................. 382/118, 100
See application file for complete search history.

(56) References Cited

U.S. PATENT DOCUMENTS

| 6,937,755 | B2 * | 8/2005 | Orpaz et al. | 382/162 |
|---|---|---|---|---|
| 7,634,103 | B2 * | 12/2009 | Rubinstenn et al. | 382/100 |
| 8,077,931 | B1 * | 12/2011 | Chatman et al. | 382/118 |
| 8,107,672 | B2 * | 1/2012 | Goto | 382/100 |
| 8,265,351 | B2 * | 9/2012 | Aarabi | 382/118 |
| 8,306,286 | B1 * | 11/2012 | Chatman et al. | 382/118 |
| 8,491,926 | B2 * | 7/2013 | Mohammadi et al. | 424/443 |
| 8,625,864 | B2 * | 1/2014 | Goodman | 382/128 |
| 2005/0111729 | A1 * | 5/2005 | Caisey | 382/162 |
| 2005/0135675 | A1 * | 6/2005 | Chen et al. | 382/162 |
| 2007/0258656 | A1 * | 11/2007 | Aarabi | 382/254 |
| 2008/0267443 | A1 * | 10/2008 | Aarabi | 382/100 |
| 2010/0271365 | A1 * | 10/2010 | Smith et al. | 345/419 |
| 2010/0288295 | A1 * | 11/2010 | Kamada et al. | 132/200 |
| 2012/0027269 | A1 * | 2/2012 | Fidaleo et al. | 382/118 |
| 2012/0299945 | A1 * | 11/2012 | Aarabi | 345/589 |

OTHER PUBLICATIONS

"The Ultimate Virtual Makeover Now Available on iPhones, iPads, and Android Devices" ModiFace—Jun. 16, 2011.*
http://www.engadget.com/2010/06/22/iphone-4-review/ "iPhone 4 Review" Engadget 2010.*
Kashem, Mohammod Abul, et al. "Face Recognition System Based on Principal Component Analysis (PCA) with Back Propagation Neural Networks (BPNN)." Canadian Journal on Image Processing and Computer Vision 2.4 (2011): 36-45.*

* cited by examiner

*Primary Examiner* — Utpal Shah

(57) ABSTRACT

A system and method are capable of performing make-up virtual images obtained with portable devices with a digital camera. The method automatically detects points of interest (eyes, mouth, eyebrow, face contour) of the user's face image allowing the user to virtually apply make-up using fingers on a touch screen. Another algorithm was created to avoid "blurring" of make-up in the application from the user's fingers. The system allows the creation of virtual make-up faces with high accuracy. To carry out the virtual make-up, methods were created for automatically detecting points of interest in the facial image and enforcing transparency in the image to simulate the make-up and restrict the make-up application area within the region where the points of interest are found. The system allows testing cosmetics application in facial images to aid choosing colors of cosmetics before actually applying them.

19 Claims, 17 Drawing Sheets

METHOD AND SYSTEM FOR MAKE-UP SIMULATION ON PORTABLE DEVICES HAVING DIGITAL CAMERAS

FIELD OF THE INVENTION

The present invention relates to the field of human interaction with mobile devices, more specifically the interaction made by processing of images stored or captured by means of the camera integrated in portable devices, in particular mobile phones, smartphones, Personal Digital Assistants (PDAs), Portable digital cameras, among others.

Techniques are used for image processing implemented in a computer simulation system of make-up to merge graphics with images stored or captured. These techniques allow, for example, to simulate different types of make-up applied on eyelids, lips, cheekbones (zygomatic bones on the region), eyebrows, shape of eyes and mouth and other facial regions with control over intensity and position, being performed manually, semi-automatically or automatically.

The use of the image of the user obtained with the handheld camera can be changed on the screen of the portable device by applying different types of make-up and/or other effects or graphics with transparency, overlap and/or filtering techniques. The detection of the face and contours of its regions is performed automatically, and can be later edited by the user, as well as colors, intensities and patterns of make-up.

The decoding system embodied in the present invention is designed to run on a portable device, it was necessary to improve the efficiency of methods and to adjust procedures to the constraints of storage and computing power of portable devices. Seeking to make the system efficient and easy to use, it was employed an interface in which the user can use his/her hands to interact directly or indirectly with the simulation make-up system. Thus, it was obtained an integrated portable system, embodied in hardware and software, which enables the simulation over make-up on static or dynamic images, captured with the camera or stored.

PRIOR ART

Make-up is a way of embellishment, aesthetic differentiation, that excites the imagination of men and women and the female audience that has its largest consumer, feeding the cosmetics industry and taking part of the time in the day-by-day of women.

Many things have been developed in recent decades in the area of face detection. One of the first methods to quickly found faces in an image can be found in M. and Viola Jones, "Rapid Object Detection Using a Boosted Cascade of Simple Features," p. 511-518, 2001. In this document, the characteristics of Haar wavelet type, analyzed with the boosting type classifiers are used in sliding windows, after a previous training, to find objects of interest. In S. Brubaker, J. Wu, J. Sun, M. Mullin, J Rehg, "On the Design of Cascades of Boosted Ensembles for Face Detection", International Journal on Computer Vision pp. 65-86, 2008, a more detailed study on the use of the method presented by Viola et al is conducted with the aim of designing good classifiers of face parts. Among the requirements for detection of faces in images, the use of points of interest is of fundamental importance in the documents S. Milborrow, F. Nicolls, "Locating Facial Features with an Extended Active Shape Model", European Conference on Computer Vision, pp. 504-513, 2008 and Liya Ding, Martinez, A M, "Precise detailed detection of faces and facial features", IEEE International Conference on Computer Vision and Pattern Recognition, vol., Pp. 1-7, 2008. With these points, it is possible to recognize parts of the face such as eyes, mouth, cheeks (cheeks), allowing applications from enlarged reality to the one suggested in the present invention for application of virtual make-up. For example, from the teachings of Liya Ding et al, an active shape model (MFA) extended is used to detect points of interest (landmarks) in face images, MFA models employs matching shape by distance metrics to recognize each form obtained from the cluster of landmarks; therefore, you can trace the points of interest in the image and detecting its neighboring regions. Methods such as Discriminant Analysis of Subclass and Gaussian models are used to detect each part of the image of a face, robustly.

The patent document U.S. Pat. No. 6,293,284B1, entitled VIRTUAL MAKE-OVER, published on Sep. 25, 2001, describes a method and apparatus for the evaluation of cosmetics in a virtual facial image, from an image of the user, an evaluation is made on the tone of the subject's skin in order to determine the optimal colors of make-up. Taking into account the skin tone, it is possible, therefore, suggested color palette of lipsticks, blushes and other make-up that are best suited to the individual. No description is made on the methods used by the system for its implementation.

The patent document U.S. U.S. Pat. No. 6,502,583B1 titled: Correcting FACE METHOD OF IMAGE, MAKE-UP SIMULATION METHOD, MAKE-UP METHOD, MAKE-UP SUPPORTING DEVICE AND FOUNDATION TRANSFER FILM, published in January 2006, relates to a system for simulation of make-up from images facial, regions of interest, such as eyebrows, eyes, nose and mouth, are chosen for the implementation of virtual make-up, nothing is described about the methods used to apply make-up in the facial image.

The patent document EP1975870A1 entitled SIMULATION SYSTEM MAKE-UP, MAKE-UP DEVICE SIMULATION, MAKE-UP SIMULATION METHOD, AND MAKE-UP SIMULATION PROGRAM, published on Jan. 17, 2006, presents various types of make-up that are simulated in a facial image captured by a camera; according to the teachings of that document, a device is created to capture the image of the face, and by means of a hardware and software interface can compose the make-up in the captured picture, printing it later if requested; the points are automatically extracted from the face, such process being started from the alignment of each region (mouth, eyebrow, nose, cheekbones, etc.) and subsequently with matching the shape of each region and each region segmentation for application of make-up, in said document, the computer methods to carry out the same are generally described, no detailed description of procedures for detecting the points of interest, as well as how to apply make-up to the image of the face.

The document titled U.S. Pat. No. 7,634,108B2: ENHANCEMENT AUTOMATED FACE, published on Dec. 15, 2009, proposes a system and method for improving the quality of the interlocutors in face video conferencing; initially, the user must point the region of the face and eyes, and then these are tracked. While temporally tracked through a regression method called Moving Average, the face image is improved from "cosmetic" effects of type correction of skin color and make-up around the eyes; as mentioned, the invention depends on the initialization user to know where are the face and points of interest thereof, not being able to automatically detect such elements, the main object of this invention is therefore to improve the image of the faces of users of video conferencing by means of the make-up process and reconstruction of the color; the method used to correct and improve facial is the Gaussian mixture model.

The document titled U.S. Pat. No. 7,643,659B2: FACIAL FEATURE DETECTION ON MOBILE DEVICES, filed in January 2010, shows the feasibility of sensing applications points of interest via mobile devices, thus, taking advantage of a few computer resources to perform the invention adequately. There are other popular applications specially adapted to mobile devices with related features, as detailed below:

Lancôme MAKE-UP, application available for Apple iPhone, and more recently for iPad and Android devices, which implements Virtual Pallete module that allows the coloring of a simple graphical illustration in simple traces using fingers to apply make-up products of the trademark Lancôme® and then sending the finished image by e-mail or Facebook®. The application offers the experience to wear the mixing colors and intensities of make-up products, appreciated by users in exploratory testing usability. However, the application does not allow the capture or the application of make-up to images of faces of real people, not implementing features of: (a) image recognition, (b) automatic detection of points of interest, or (c) application of make-up on the faces over real skin tones.

MAKE-UP SIMULATOR, application available for Android, and more recently for Apple iPhone, allows you to capture photos or use of such graphic illustrations for applying make-up. It performs analysis of the face image and detection points of interest (eyebrows, eyes, mouth, apples and contour of the face), allowing the correction of lines and the application of various make-up products. Exploratory testing usability of the application showed that users were dissatisfied with: (a) the fact that each product selection failed to see the face image, (b) lack of appropriate colors for dark skin tone, (c) despite the variety of colors available for each product, there is no hint on harmonization of products, (d) the fact that the automatic application of make-up product, whose color had been selected, with regulation of intensity by using a scroll bar, not allowing the experience with mixing colors and intensities obtained from actual experience in applying make-up with your fingers.

MAKE-UP, an application developed by ModiFace, available for Apple iPhone, claims similar functionality to the application Make-up Simulator, although different implementation in graphical user interface. It allows you to capture a photo gallery of the device or image galleries of photos of friends on Facebook. However, the application does not implement, in fact, the image recognition and automatic detection of points of interest, leaving, instead, to the user to position pattern mask elements (points of interest) of eyes, eyebrows and mouth on the picture to make up. Exploratory testing usability of the application showed that users were dissatisfied with: (a) the difficulty of adjusting the mask of points of interest on the image to make up, (b) the fact that each product selection failed to see the image face, (c) the fact that there are variety of colors available for each product, but there is no hint on harmonization of products, (d) the fact that the automatic application of make-up product, whose color had been selected, eliminating the experience experimenting with mixing colors and intensities obtained from actual experience in applying make-up.

We identified other applications available for web related features, as detailed below:

The Company Natura S/A provides the functionality of the virtual make-up at http://www.adoromaquiagem.com.br/maquiagem-virtual/ and accepts images sent by the user or available on web pages. The application does not make the image recognition and identification of points of interest. Instead, it calls for the user to position masks on these points (iris, contours of the eyes, eyebrows, mouth, teeth, face). Thereafter, a range of products and colors is provided, in accordance with the tone of skin, according to the selection of the user. The application of make-up is done automatically. The application allows you to compare the effects of make-up, remove it and save the result. But it not allow you to publish it on social networks, although there are links to pages of Natura on Facebook, Twitter, Flickr, YouTube.

The Taaz (http://www.taaz.com/makeover.html) offers the functionality of Virtual Makeover from a standard image gallery site or a photo posted by the user, but this feature does not seem to work and the application of gallery photos to make-up dispenses with any method of image recognition. Thus, the differential of the site is a graphical interface, the variety of products and colors and an indication of professional products related to choices of the user. The same is true on the site of Mary Kay (http://www.marykay.com/whatsnew/virtualmakeover/default.aspx) or in its Brazilian version http://www.marykay.com.br/vmo.html), in which case the particulars of products restricted to one trademark.

PROBLEMS TO BE SOLVED

Despite technological advances, mobile devices still have hardware with relatively limited resources to execute algorithms that perform advanced calculations. Therefore, the present invention applied processing techniques in order to reduce the computational cost, allowing a reduction in the time of image processing and minimizing the use of the processor of the portable device, and save memory, thus optimizing the use of resources increasing the efficiency of the process described in this invention.

The conventional make-up process requires more time and resources than its simulation proposed by the present invention. Moreover, the conventional process may require redoing her make-up, which is much simpler and faster in a computer simulation. Adding to this the convenience of availability at any time and place, the use of portable devices makes it possible to save time and resources in the simulation of make-up.

The images obtained from the simulation of make-up are easily stored and transmitted, as they are already in digital form, which facilitates the diffusion and integration with other systems. Therefore, the make-up simulation process eliminates an intermediate stage of image capture of the face after applying make-up, for comparison of "before and after" the make-up process.

Using make-up computer simulation eliminates the need to carry a large quantity of items to try different make-up, since the user can simulate the desired effects for subsequently performing physical make-up, if desired. This shows the flexibility and versatility to incorporate different types of make-up in the process proposed without the need to purchase products in advance to test different make-up.

The method proposed in this invention also makes it accessible and simple procedure for make-up, for both lay and professional, assisting in the detection of regions of the face and applying make-up styles. Thus, the proposed method allows to combine ease of use, versatility, flexibility, saving time and resources, ease of storage and transmission, and an alternative or complement advantageous over the conventional make-up.

Technical/Functional Advantages of the Invention

Versatility and Flexibility:

Use of methods to perform image processing applied to the make-up simulation on an image capturing and storing of the user. Thus, it becomes possible to simulate different types of make-up in the portable device, reducing stress, cost and time spent in this process.

Low Computational Cost:

seeking to reduce the processing time, programming practices were used to optimize the performance of computational instructions, for example, using fixed point instead of floating point, using bit manipulation for certain operations, using a minimum of instructions possible to scan or copy the pixels of an image, among others.

Intuitive Interface:

The interface enables the use of hands/fingers to simulate the application of make-up on her face, being extremely intuitive for the user of the conventional make-up. Add to this the automated detection of regions of the face and make-up styles, bringing significant advantages over the conventional process.

Interactive Simulation in Real Time:

The results of the interaction the user with the make-up simulation process are shown in real time. The use of hands reproduces the physical interaction that occurs in the conventional process, playing a pleasurable experience with mixing colors and intensity, with the advantage of being able to perform make-up in a simple manner even for those who are not familiar with aesthetics, following the partial results along of the process.

Ease of Storage and Distribution:

Simulation results of make-up can be easily stored and transmitted, as they are already in digital form. This facilitates the dissemination of simulation results for make-up the user. Adding to that the possibility of creating a history of make-up previously accomplished, because the results can be easily stored.

Automatic Detection of Regions of the Face:

The method of the present invention performs automatic detection of regions of the face for make-up application. This detection can be used to delimit the regions affected by the application of make-up, avoiding, therefore, the incorrect application of make-up.

Changing the Face Regions:

Regions detected automatically by the simulation process of make-up can be altered by the user, as desired. Thus, combining to this the efficiency of automatic detection with the flexibility of adjustments by users.

Smoothing the Contours of Make-Up:

The simulated make-up is automatically smoothed in the contours of the region applied, bringing more realism and approaching the conventional process of make-up (reference). This also makes it easy to use, even by those who are not familiar with aesthetics.

Facility to Redo the Make-Up:

The make-up removal can be done much faster than the conventional process, besides being substantially cheaper. Adding to this the possibility of storing the earlier stages of make-up and return to them more quickly.

Choice of Face Form:

A user can apply make-up to the chosen form of face s/he want, whether himself or another image stored in the face of others. The portable device allows you to capture images for the simulation of make-up.

Choose Make-Up Styles:

The proposed process offers different styles of make-up, with different color palettes for each style of products, which allows the creation of a harmonious combination in the make-up. This facilitates the use of the system and allows a more consistent interface to the user.

Ease of Self-Make-Up:

A preview of the captured image itself allows the realization of self-make-up easier. The intuitive interface of the proposed process facilitates the simulation of self-make-up by those who are not familiar, with the possibility of remaking make-up easier.

Reducing Costs and Time:

The method proposed by the present invention reduces the cost required to simulate different types of make-up, because the simulation does not require the purchase of items of make-up. Changes in the make-up are also much faster with automatic detection of regions of the face and the use of make-up styles pre-defined.

Space Saving and Portability:

The ability to store numerous styles with different palettes and make-up products allows to simulate the make-up using only a handheld device that is equivalent to a set of physical items that take up space that would have a less practical transport. Thus one obtains a make-up simulation process, which saves space and is more readily transportable than the equivalent material in the conventional process.

SUMMARY OF THE INVENTION

The present invention is a make-up simulation system using image processing, embodied by means of an integrated software and hardware that applies make-up effects and/or other graphics in real time by means of portable devices having a digital camera. The system simulates make-up on static or dynamic images using the identification manual, semiautomatic or automatic regions of the face.

The present invention aims to provide a low-cost, efficient and effective, that enables users to simulate users and make-up on his/her own face pictures or other images of faces stored at any time and place as they deem appropriate.

The main motivation for the development found in this invention is the manifest desire of users to try and simulate the application of different types of make-up minimizing effort, cost and time spent. In choosing the proper make-up user typically applies different make-up products and change the colors to get the desired result. This process, considered as attractive and able to retain the attention of users, depending on availability of time, make-up products and resources for their acquisition. Exploratory usability testing showed that users expect to find current styles and colors and suitable for his/her skin tone and enjoying the experience with mixtures of colors and intensities provided by the act of applying make-up. With the system developed by the present invention, this process becomes much more effective and efficient, providing the desired user experience and providing a preliminary model before the physical application of make-up on her face.

The following is a sequence of steps illustrated using one embodiment of the present invention, without limiting other possible sequences or embodiments for using the method of the present invention.

a) Initially, the user captures the image of the face with the aid of a cross in preview mode. The detection of regions of the face is performed automatically for subsequent application of make-up.

b) After detection, the user has the possibility to modify the lines demarcating the regions of the face detected automatically.

c) Then the user selects one of several styles of make-up that are reflected in the color palettes of products to be applied on the face. Several products are simulated (e.g., foundation, blush, shadows, lipstick, pencil outline, etc.), having their respective colors selected by the user, as well as its intensity and mode of application on the face.

d) the user has the possibility of using touch interface to define the position and intensity of colors for different make-up products.

e) Thereafter, the user can switch between the images of the face without make-up and with make-up for comparison, there is also the possibility of removing the make-up to restart the process.

f) If the user is satisfied (a) with the result, you can store the image locally on your device or share it via email or social networking configured on the portable device.

In short, the system of the present invention allows user to use portable devices to simulate make-up and/or manipulate images captured or stored. The detection of interest points (eyes, mouth, eyebrow, face contour) in the face image of the user is automatic and adjustable, and the system allows the user to make the application of make-up by the fingers on a touch screen while avoiding the "blurring" of make-up in your application with hand gestures. The make-up simulation is interactive, allowing user to view the results as it interacts with the system. Thus, you get an interactive, efficient and effective process for the simulation of make-up.

BRIEF DESCRIPTION OF DRAWINGS

The objects and advantages of the present invention will become more apparent from the detailed description of an exemplary embodiment of the invention in the following section, and accompanying figures by way of non-limitative example, wherein.

DESCRIPTION OF PREFERRED EMBODIMENTS OF THE INVENTION

The present invention was implemented, by way of non-limitative example, in a system simulating the make-up process in a digital picture obtained by portable devices equipped with a digital camera. From the system embodied by the present invention, it has become possible to develop a method for previewing make-up, allowing the user to display the result of this application by means of a portable device, and by this he can experience different make-up quickly and effectively. Thus, we obtained as a preferred embodiment of the invention a method that detects the points of interest to the face, performs the mapping of areas of the face where to apply make-up, using touch screen interface to make the make-up, avoiding the "blurring" and combining make-up applied to skin color with the color of the product, simulating the application of a real make-up. The method is implemented in an integrated hardware and software system.

Figure 1:
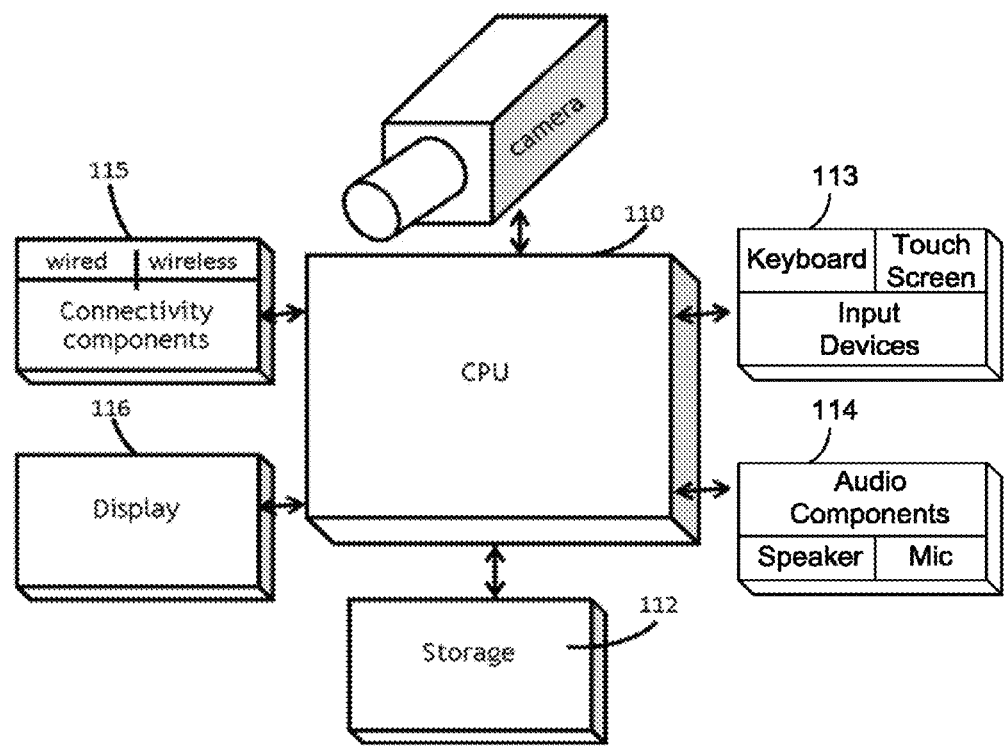
FIG. 1 shows a generic model of the portable device where the system should work.

The system embodied for this invention can be implemented in a portable device which main features are illustrated in FIG. 1. The instructions used to drive the digital camera, location of the face in a photo, image processing for segmentation of regions of the face, among others, are processed in the CPU (110) (Central Processing Unit). Using the camera (111), the capture of images in real-time preview mode is carried out. The information and data, such as color palettes of products used in make-up and the photos with make-up applied are saved on the storage medium (112). The information input devices (113) correspond to the portion of hardware that intercepts keyboard events and touch of the user on the touch screen. The audio components (114) capture and reproduce sounds, and in turn are part of the hardware of the present invention. The connectivity component (115) allows the user to use remote services such as social networks and email, to share and disseminate the images with the make-up applied. To view the data and images provided by the portable device, it uses the display means (116).

Figure 2:
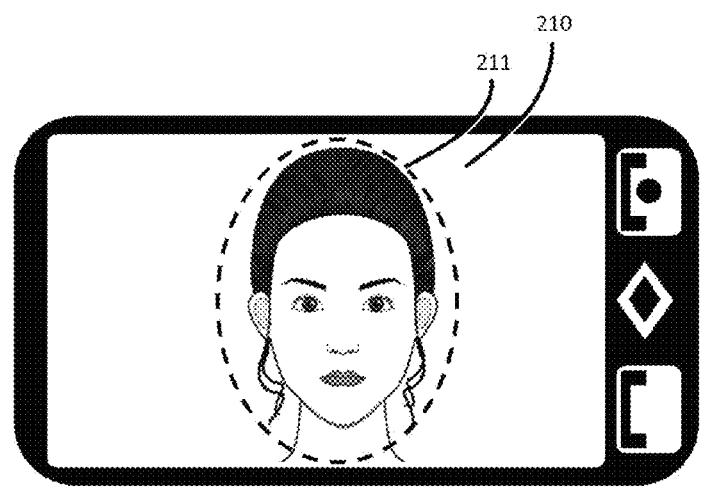
FIG. 2 illustrates the system interface presented to the user, containing a cross for easy framing the face, and the resulting position and distance from the camera device.

The system designed from the present invention begins to be executed by the user via a portable device, which was previously installed. After its start, the camera is triggered and starts shooting the pictures at runtime and displays them on the display (210) of the portable device at a certain display rate (e.g. 30 FPS). It is in this initial screen, as illustrated in FIG. 2, that the frames are captured and sent to the method which performs the location of the face. To optimize this process, we created a cross (211) where the user should frame his face. With this improved the efficiency of the process of locating the face, since the processing is performed only within the region of the target. By framing the face within the limits of sight, a proper proportion is obtained between the size of the photo and the region occupied by the face, decreasing in turn, the number of scales used to make the search for the face. The framing of the face at the sight makes the user to be positioned at a distance from the camera to provide a better application of make-up and a better view of the same.

Many portable devices are equipped with two cameras, one front and one rear, where in general, the former having a higher quality and more features. However, with the front camera is possible to simulate a mirror, since it is located on the same side of the display, which makes it possible to perform self-shoots. Taking advantage of this feature, the present invention provides the user two capture options: 1) by means of the front camera, you can use your device as a mirror, because the user can view the result of his self-portrait before making the capture of the same, and 2) with the rear camera, capturing pictures with higher resolutions.

Figure 3:
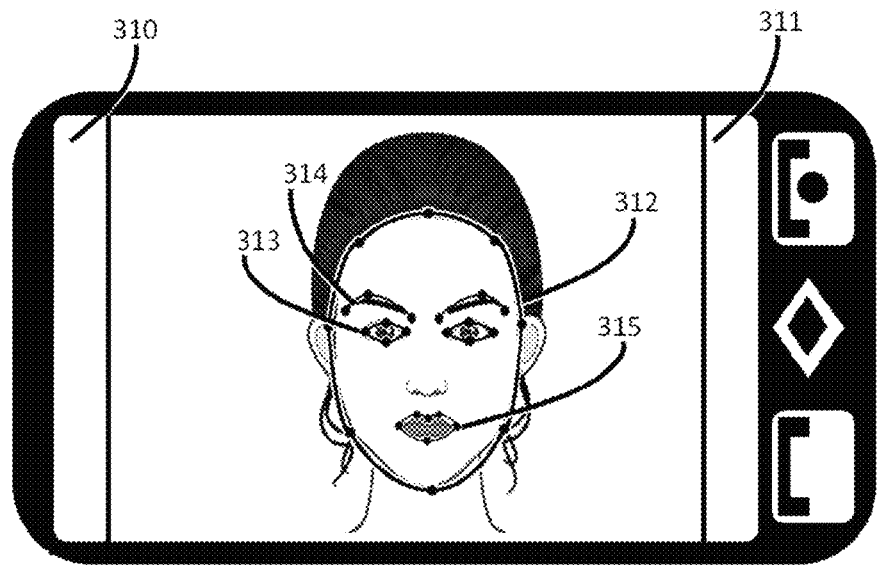
FIG. 3 illustrates the automatic identification of points of interest, and tuning resources of these points, that allow to draw the segmentation mask of face regions.

After capturing the photo, the procedure is performed to locate the face and segment regions of the same. To assist in the targeting of regions of the face, we obtained first the points of interest. The system embodied by the present invention provides an interface to the user to adjust the regions of the face by the points of interest. These adjustments are necessary to refine the segmentation result of the regions to be made up. The interface to make these adjustments is presented in FIG. 3. This interface has two sidebars (310) and (311), where in a bar to access features such as undoing and redoing, and other bar can perform functions for enlarge image in a particular region of the face, such as mouth, or eye brow, increasing in turn the accuracy of the adjustments made by the points of interest found.

From the points of interest found, polygons can be formed that are interconnected by the interpolation of Bezier obtaining polygons that define the regions of the face the user. In (312), (313), (314) and (315) the polygons representing the regions of the face, eyes, the eyebrows and the mouth respectively are presented.

After the appropriate adjustments to the points of interest, then it creates the masks necessary to segment the regions of the face where the make-up is applied.

Figure 4:
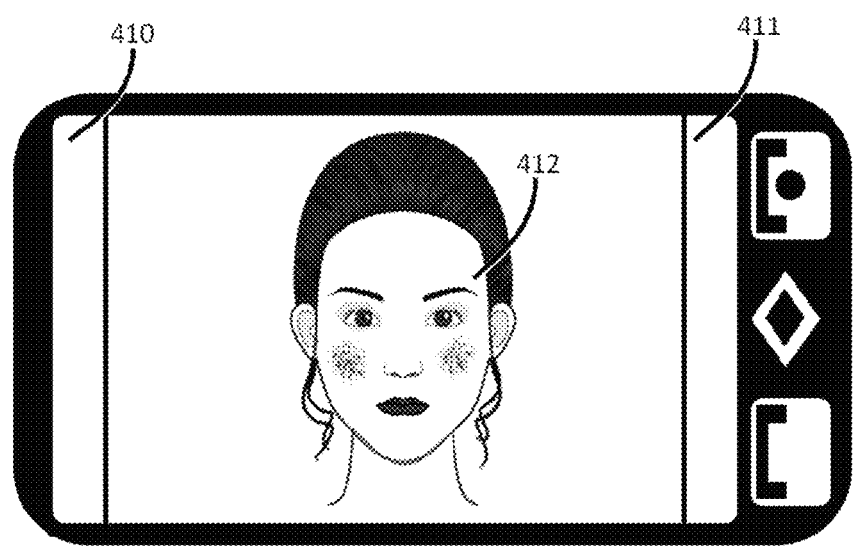
FIG. 4 illustrates the interface used for applying make-up.

FIG. 4 shows the interface used for application of make-up with two toolbars (410) and (411) containing several features, such as product selection, color selection, style selection, actions to redo/undo make-up among others. After choosing the product and color that will be used, the user does the application of make-up. This process is performed from the touch screen of the portable device, by which it is possible to use the user's fingers to apply make-up, mix colors or increase the intensity of a given product. The result of applying make-up is displayed on the display of the portable device (412).

The method of the present invention is the implementation of virtual make-up. To be executed, this method finds the face and its constituent parts (eyes, eyebrows and mouth), segmented regions of the face, searches points of interest regions of the face, creates masks to define the regions where the make-up is applied, prevents "blurring" of the region made up, combines the colors of the skin with a product used to provide a realistic effect to the result of make-up, makes up using your fingers, making the simulation to be performed similarly to the real process of application of make-up and allowing the user to view different styles of make-up efficiently and effectively.

Figure 5:
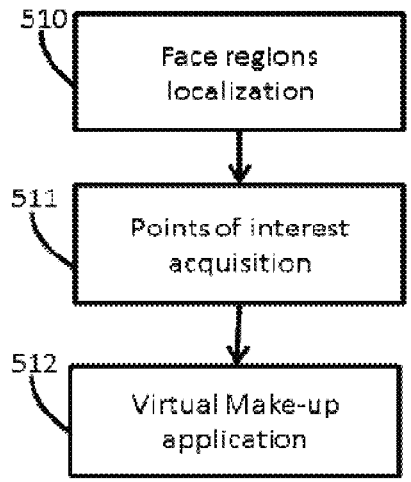
FIG. 5 shows the result of three main steps of the make-up simulation process.

The make-up simulation process of the present invention is basically divided into three main stages: "Location of the regions of the face (510)", "obtaining the points of interest (511)", "Application of virtual make-up (512)", illustrated in FIG. 5.

The steps of "Location of the regions of the face (510)" and "Obtaining the points of interest (511)" are performed right after the capture of the photo and have the purpose of finding the face of the user in the region of sight, eliminating parts that do not belong to this, and thus optimizing the segmentation of regions of the face.

Figure 6:
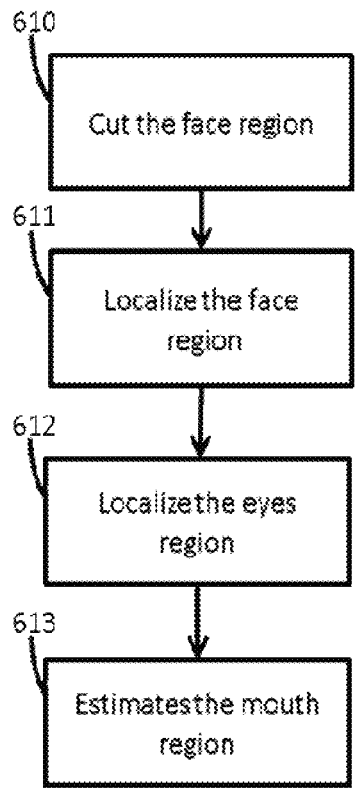
FIG. 6 shows the flow of the steps involved in step "Location of the regions of the face".
Figure 7:
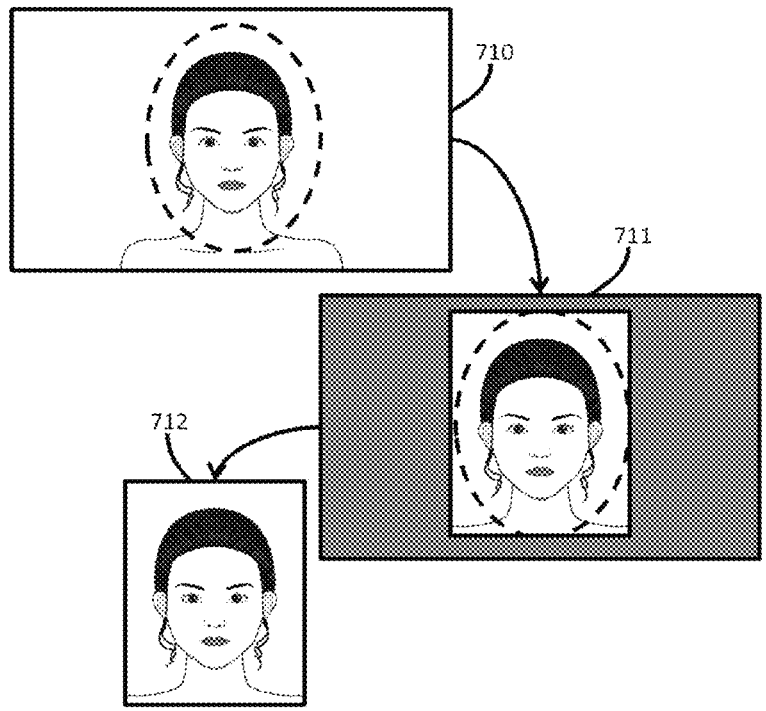
FIG. 7 illustrates the first step the step of locating regions of the face, the cutout in the region of the sight.

The steps involved in the step of "Location of the regions of the face" are sequentially displayed in FIG. 6. The first step of the location of regions of the face illustrated in FIG. 7 is cutting the target region (610), since the captured picture (710) has a lot of unnecessary information and which can adversely affect this process. Therefore, we select only the region of the rectangle corresponding to the target (711) and copy the pixels are present in this region to a new image (712). With this, it is possible to reduce the cost of computing location of the face besides increasing the accuracy of the detection process.

After selecting only the region of the target, it tries to then locate the region of the face (611) and the eye region (612) and the mouth region (613) of the user. For this, we used an Artificial Intelligence area known as Machine Learning. Machine Learning Techniques for using a collection of data for "teaching machine" to answer questions on the same. The present invention employed these techniques to verify the existence of a face in a digital image.

Machine Learning techniques are generally divided into two phases: training and prediction. To carry out the training, it is necessary to construct a model of data collection. The model consists of a set of mathematical representations with characteristics of the data for learning. These mathematical representations are known as "signatures" or "features". During the execution of training, the set of features is analyzed, with the weights and thresholds, among other parameters, are adjusted to maximize the learning process. The prediction model generated will use the training to make a decision or sort a data set.

To detect the face to be made up, we tried to use a Machine Learning technique that is able to return whether the information in a digital image is a face, efficiently and effectively. The technique used by the present invention employs binary classifiers (face or not face) of the type boosting whose characteristics are: high detection and low rejection. Said technique consists in using a binder chain weak rejection. The above method can be used to locate different types of objects, whose purpose will depend on the training model, which is subjected. For the present invention, we used a previously trained to detect the end faces and the other to detect eye.

Figure 8:
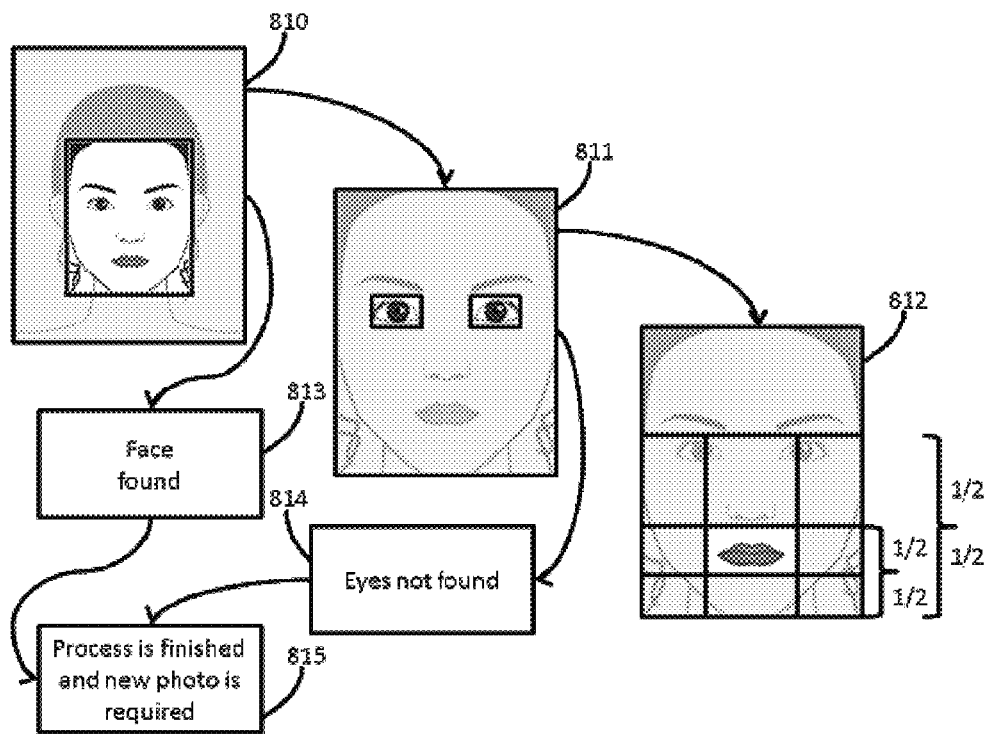
FIG. 8 illustrates the location of the region of the face, eyes and mouth.

Using the techniques described above, the location of the face (810) takes place, as illustrated in FIG. 8, selecting as region of interest only the region defined by the classifier as a face. Thus, it avoids processing areas that do not belong to the face of the user. Then, a search is effected by the eyes (811) within the region of the face. The detection of the eye is made similarly to the face detection, only changing the training model used in the classification.

After obtaining the position and size of the region of the face and eye regions, it becomes possible to estimate the mouth region (613) without using a binder. This estimation is presented in (812), and is calculated from the ratio between the parts of the face where the left side of the mouth area is aligned with the center of the left eye and right side is aligned with the center of the right eye. Then, based on the result of the location of the eyes, are calculated for the centers of the left and right sides of the mouth area. It has also that the top region of the mouth is positioned in the middle position between the eyes and chin, and the foundation of the mouth region corresponding to half the distance between the top region of the mouth and chin. Equations 1 and 2 below show the calculations used to estimate the region where the mouth is located.

$$boca_{x_0} = \frac{olho_{x1}^e - olho_{x0}^e}{2} \qquad (1)$$

$$boca_{x1} = \frac{olho_{x1}^d - olho_{x0}^d}{2}$$

$$boca_{y0} = \frac{olho_{y0}^e + olho_{y0}^d}{2} \qquad (2)$$

$$boca_{y1} = boca_{y0} + \frac{boca_{y0} - face_{y1}}{2}$$

Equation 1 estimates the positions of left and right side of the mouth, represented by $boca_{x_0}$ and $boca_{x1}$, respectively. By this equation, it estimates the center of the left eye and right eye center, where $olho_{x1}^e$ and $olho_{x0}^e$ represent the left and right borders of the region of the left eye $olho_{x1}^d$ and $olho_{x0}^d$ represent the left and right borders of the region of the right eye. The equation 2 calculates the positions for the top and bottom of the mouth area. In the Y-axis, the top of the mouth area is represented by $boca_{y0}$ and corresponds to the average positions of top eye, where $olho_{y0}^e$ is the top left eye and $olho_{y0}^d$ is the top of the right eye. Also in the y-axis, the base region is represented by $boca_{y1}$, which corresponds to the sum of $boca_{y0}$ with half the distance between the base and top face of the mouth region, where $face_{y1}$ is the base of the mouth area.

If the classifier cannot find the region of the face (813) or eyes (814) in the input image, then this step is completed and a new image is requested (815), initiating the process for applying make-up again.

After obtaining the regions of the face parts of the user, it begins the step to obtain the points of interest (511). To calculate the points of interest, it is necessary to segment the parts of the face used to perform the make-up.

Figure 9:
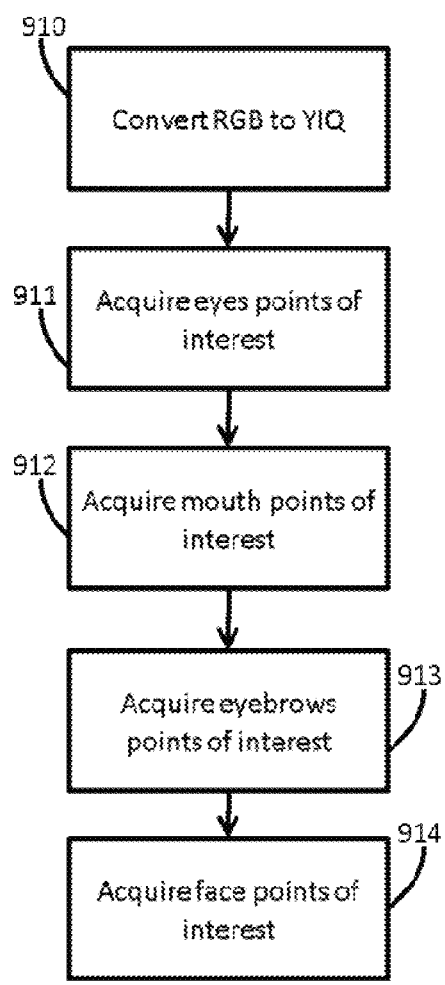
FIG. 9 shows the flow of the steps involved in the step "Obtaining points of interest in the face."

The flow shown in FIG. 9 shows the steps performed to obtain the necessary points of interest for the segmentation of the regions where the make-up will be applied. To perform the separation of parts of the face, first converts the image, which is in the RGB color space (Red-Red, Green-Green and Blue-blue) to YIQ color space (910), wherein Y storing the luminance information, which is the amount of light present in the image and representing the gray scale image, and components I and Q store chrominance information and represents the colors.

The method used to convert the image from RGB to YIQ is shown in Equation 3, which makes the approximate conversion from RGB to YIQ.

$$\begin{bmatrix} Y \\ I \\ Q \end{bmatrix} = \begin{bmatrix} 0.299 & 0.587 & 0.114 \\ 0.595716 & -0.274453 & -0.321263 \\ 0.211456 & -0.522591 & 0.311135 \end{bmatrix} \times \begin{bmatrix} R \\ G \\ B \end{bmatrix}, \qquad (3)$$

onde $R, G, B \in [0, 1]$

Figure 10:
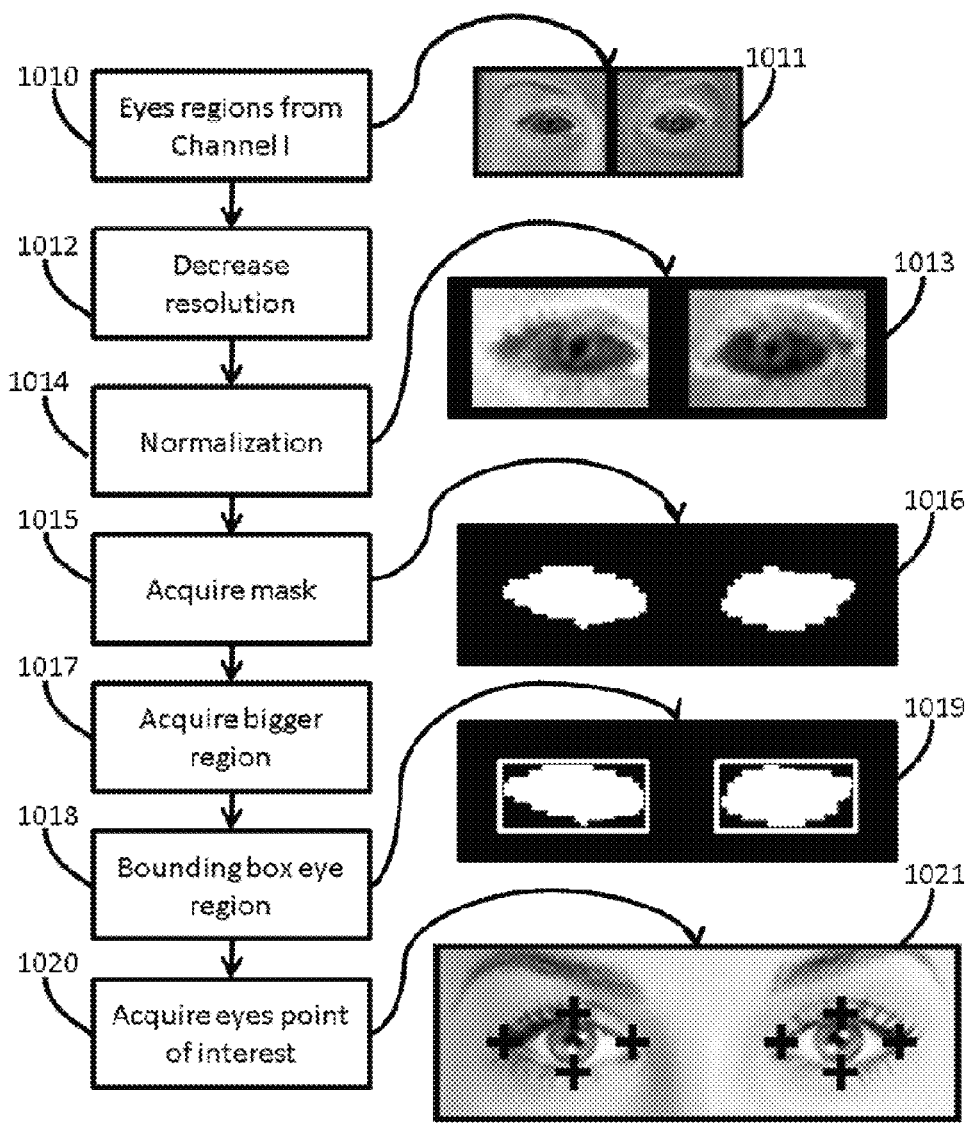
FIG. 10 illustrates the steps for obtaining the points of interest of the eyes.

The first point of interest are obtained from the eye (911), which method used to obtain these is shown in FIG. 10. To perform the segmentation of the eye region, uses the channel I (1010), due to the large distance between the pixels of the pixels of the skin and eyes, which makes the separation thereof. At 1011, it presents the image of the eye region with the information of channel I, where you can note the difference between skin tone and eye shading.

Seeking to reduce the computational cost, decreasing the resolution of the selected region (1012), improving the grouping of pixels for segmentation. The selected region will have its size reduced by 50% of its size, which will result in a decrease in execution time of the process of obtaining the points of interest of the eyes.

The channel I values comprises a range between 0.5957 and −0.5957. Seeking to reduce the amount of floating point operations, normalize the image (1013) in integer values between 0 and 255. After the normalization and conversion into integer values, it also improves the flexibility of the cut-off threshold used for targeting. The normalized image is presented in (1014).

$$I'(x, y) = \frac{I(x, y) - \min(I(x, y))}{\max(I(x, y)) - \min(I(x, y))} \times 255 \qquad (4)$$

The calculation used in the normalization of the image is shown in Equation 4, where x represents a column and y representing a line. The min and max functions return the smallest and largest values of a matrix respectively. I (x, y) contains the original pixels of the channel I and I'(x, y) receives the normalized values.

The segmentation of the eye region is carried out after obtaining a binary mask (1015), where the portion of the pixels with values equal to one (1) corresponds to the eyes the user. To obtain the mask, you must perform a digitalization process, which aims to segment the image into two colors. At 1016 is illustrated an example of mask obtained after the digitalization.

$$\mu_e = \frac{1}{M_e N_e} \times \sum_{y=0}^{y < M_e} \sum_{x=0}^{x < N_e} I'(x, y) \qquad (4)$$

$$l_e = \mu_e (1 - perc) \qquad (5)$$

To digitalize the image, one needs to calculate a cutoff value that separates the regions that are wanted to be targeted. This cut-off value is an intermediate color tone and is known as the threshold. The attainment of the threshold for segmenting the eyes is shown in Equations 5 and 6. Equation 5 calculates the average of the eye region, where $M_e$ is the height and $N_e$ is the width of the region of the eye. This average is calculated using the normalized values of the channel I, represented by I'(x, y). Because the tone of the region of the eyes are usually smaller than the rest of the image Ie is obtained by applying a percentage of the mean value obtained by using (1-perc), as shown in Equation 6, in turn, obtaining the threshold set to properly digitalize eyes of the user. The variable perc is a normalized value between 0 and 1 that represents a percentage of the mean (non-limiting example: perc=0.25).

$$B_e(x) = \begin{cases} 255, & para\ I'(x,y) >= l_e \\ 0, & para\ I'(x,y) < l_e \end{cases} \quad (6)$$

After obtaining the mask, many parts can be identified as false positives. Then, if you set the valid region with the eyes is the one with the largest area (1017). To separate the different regions and to obtain the area of each region was sought to the contours of all polygons in the present mask and then calculate the area of each polygon found, leaving only the one with the largest area. The outlines of the polygons are obtained by a method for tracking contours in binary images described in [8].

$$l_e = \min(X_e); r_e = \max(X_e);$$

$$t_e = \min(Y_e); b_e = \max(Y_e). \quad (7)$$

After the process described above, is then calculated from the area bounding rectangle corresponding to the eye (1018) from the user. Equation 8 shows the calculation used to obtain the bounding rectangle of the eye, where min and max return respectively the smallest and largest value of a vector, $X_e$ represents the horizontal coordinates and $Y_e$ is the vertical coordinates of the eye of the user. The coordinates of the bounding rectangle are stored in $I_e$ (left), $r_e$ (right), $t_e$ (top) and $b_e$ (base). The result of this operation is illustrated in (1019). The points of interest are obtained from the eye (1020) from the calculated bounding rectangle in the process described in the preceding paragraph. Each eye has four points of interest illustrated in (1021).

$$ponto_{x0}^{olho} = \frac{r_e - l_e}{2}; ponto_{y0}^{olho} = t_e; \quad (8)$$

$$ponto_{x1}^{olho} = \frac{r_e - l_e}{2}; ponto_{y1}^{olho} = b_e;$$

$$ponto_{x2}^{olho} = l_e; ponto_{y2}^{olho} = \frac{b_e - t_e}{2};$$

$$ponto_{x3}^{olho} = r_e; ponto_{y3}^{olho} = \frac{b_e - t_e}{2}$$

Equation 9 shows the calculation used to obtain points of interest, where, $ponto_{x0}^{olho}$, $ponto_{x1}^{olho}$, $ponto_{x2}^{olho}$ and $ponto_{x3}^{olho}$ represent the coordinates of the points in the x-axis, $ponto_{y0}^{olho}$, $ponto_{y1}^{olho}$, $ponto_{y2}^{olho}$ and $ponto_{y3}^{olho}$ represent the coordinates of points on the y-axis. The first point is located at the top center of the bounding rectangle and the second point at the bottom center. The third point and fourth point located in the center left and center right, respectively, of the bounding rectangle. From these points then you get the eye area of the user, besides serving as a parameter to obtain the regions around the eyes where you will apply the make-up.

Figure 11:
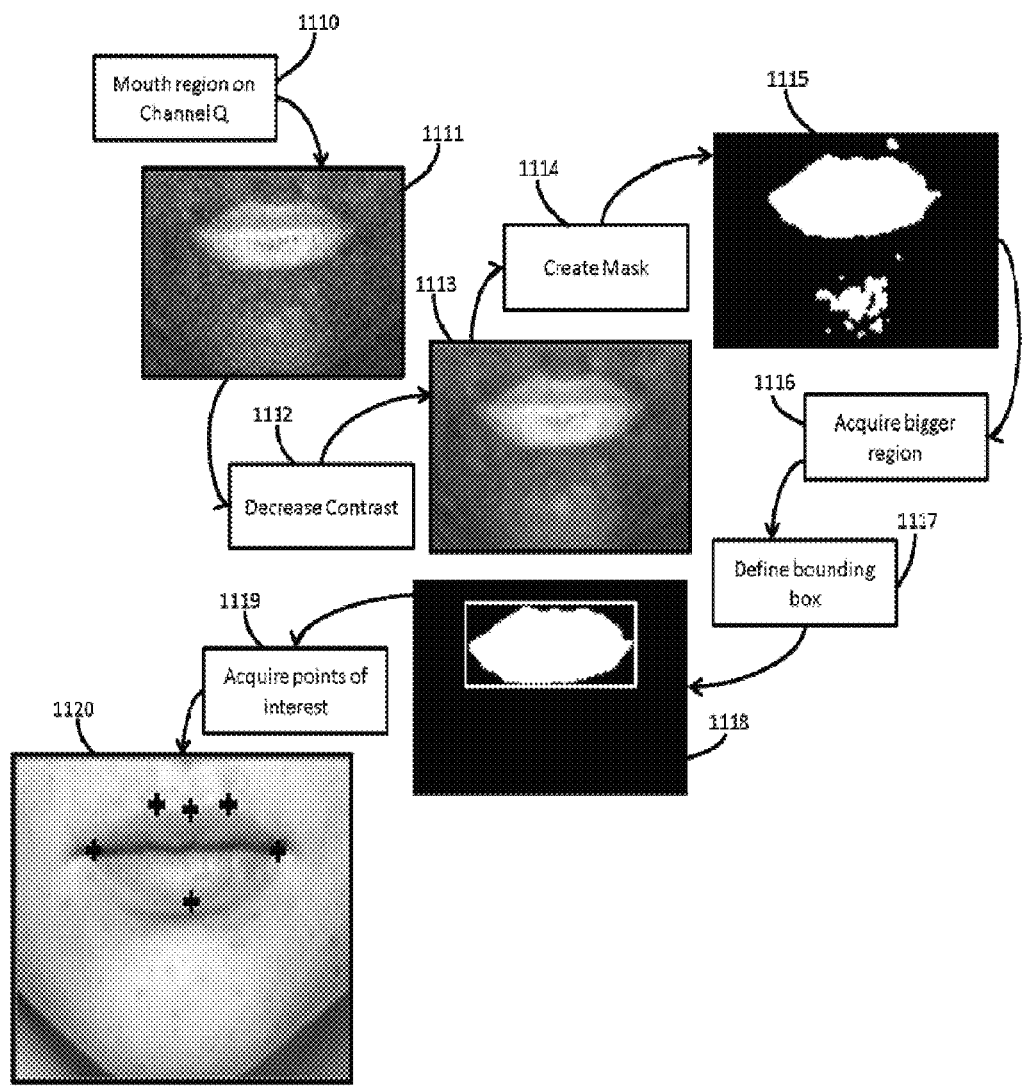
FIG. 11 illustrates the steps to obtain the points of interest of the mouth.

The acquisition of points on the mouth (912) is performed by analyzing the pixels of the Q channel performing a process similar to that used in obtaining the eye points of interest. The procedure for estimating points on the mouth is shown in FIG. 11. In order to calculate the points of interest from the mouth selects only the mouth region in the channel Q (1110). From the Q channel, it is possible to target the area of the mouth easily because of the difference between the tone and tone of the skin of the mouth, as seen in (1111). The image on the Q channel has a high level of unwanted artifacts, which makes the separation of the mouth area of the rest of the image. In order to solve this problem applies a filter that reduces raisins low-contrast (1112) image and eliminates unnecessary elements which hinder the achievement of points of interest. The filter used is the "Median" and the result is presented in its application (1113). The segmentation of the area of the mouth is accomplished by creating a binary mask which separates the mouth of the rest of the image (1114). The process of creating the mask is similar to the process used in the estimation of the above points of interest of the eyes. The digitalization is performed by performing the Equations 5, 6 and 7, where the parameters are changed so that the calculations are performed in the mouth area. The result of digitalization is exemplified in the mouth (1115). The calculation of the contour of the areas obtained from the digitalization is performed using the same method performed in obtaining the point of interest of the eye, leaving only the outline of the largest region (1116). Then, it calculates the bounding rectangle (1117) using Equation 8, the result is presented in (1118).

Figure 12:
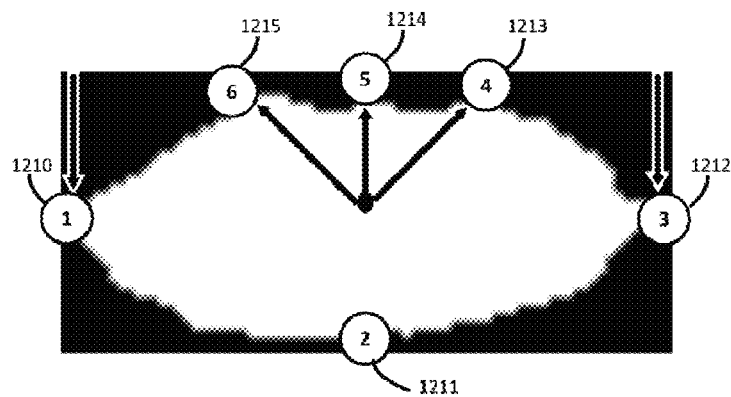
FIG. 12 shows the detail of the mapping of points of interest of the mouth.

After obtaining the bounding rectangle, execute the method that estimates the sights of the mouth (1119). FIG. 12 illustrates the mapping of points of interest of the mouth, which runs within the bounding rectangle of the mouth and uses the mask's mouth to make the search for the coordinates of the points of interest, as described below:

The first point of interest (1210) corresponds to the coordinate of the first non-zero pixel of the first column within the bounding rectangle;

The second point of interest (1211) is represented by the coordinates of the bottom center of the bounding rectangle;

The third point of interest (1212) corresponds to the coordinates of the first nonzero pixel of the last column within the bounding rectangle;

The fourth point of interest (1213) is calculated using a scanning line oriented 45° and that starts in the center of the bounding rectangle. This point corresponds to the coordinates of the last non-zero pixel of the scanning line.

The fifth point of interest (1214) is estimated from a scanning line that starts in the center of the bounding rectangle and has a 90° orientation. The coordinate of the last non-zero pixel of scanning line corresponds to the fifth point of interest of the mouth.

The sixth point of interest (1215) refers to the last non-zero pixel of a scanning line that starts in the center of the bounding rectangle and has an orientation of 135°.

Figure 13:
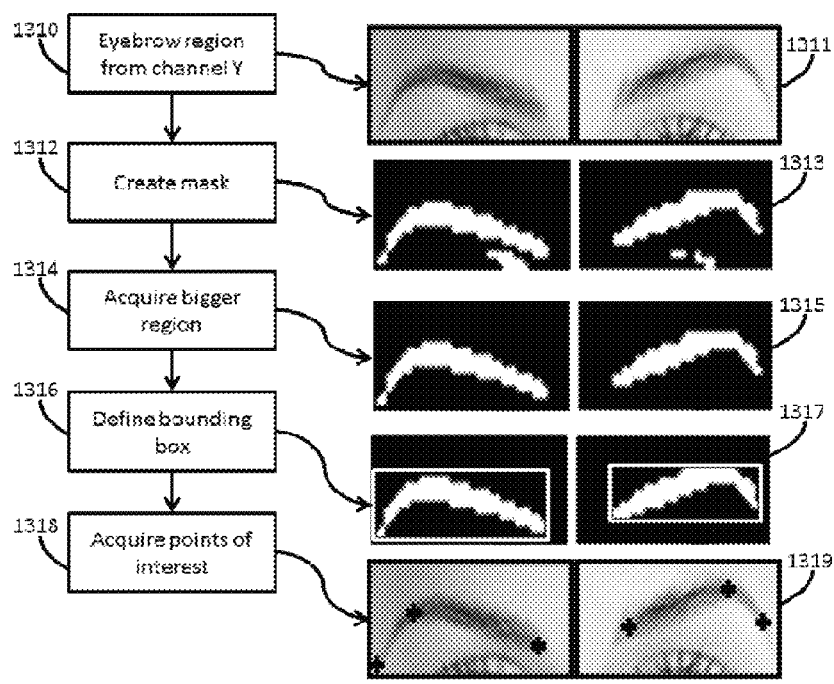
FIG. 13 illustrates the steps to obtain the points of interest of the eyebrows.
Figure 14:
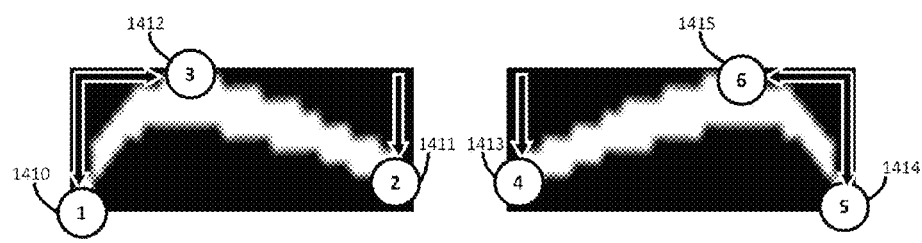
FIG. 14 shows the detail of the mapping of points of interest of eyebrows.

After acquiring the sights of the mouth, then executes the method used to obtain points of interest eyebrows (913). This is shown in FIG. 13 and in turn is executed similarly to the method of obtaining points of interest of the eyes and mouth. To estimate the points of interest of the eyebrows, you select a region between the eyes and forehead of the user which corresponds to half the distance between the eyes and the top face. The process used to calculate the points of interest eyebrows analyzes the pixels of the Y channel, which corresponds to the gray level image (1310). The selected region to be processed is presented in (1311). To obtain the sights of the eyebrow is necessary to create a mask that separates the brow of the rest of the image (1312). For this we used the same methods for digitalization executed in the search for points of interest of the eyes and mouth, but with changed parameters for the eyebrows. The result of digitalization is illustrated in the eyebrow (1313). Similarly to the aforementioned methods, we obtain the contours of polygons present in the mask, then select the largest region (1314). The result of this operation is shown in (1315). Then one obtains the bounding rectangle of the obtained area (1316), whose result is illustrated in (1317). From the area of the bounding rectangle of each eyebrow makes the procedure for estimating the points of interest (1318), illustrated in FIG. 14. This procedure is described below and shown as the points of interest are obtained eyebrows:

The first point of interest (1410) corresponds to the coordinate of the first nonzero pixel of the first column within the bounding rectangle of the left eyebrow;

The second point of interest (1411) corresponds to the pixel coordinate of the first non-zero in the last column of the bounding rectangle of the left eyebrow;

The third point of interest (1412) corresponds to the coordinate of the first nonzero pixel of the first line within the bounding rectangle of the left eyebrow. Due to the different shapes of eyebrows, the coordinate of the third point could be estimated incorrectly. To solve this problem, we defined a minimum distance between this point and other points of the left eyebrow. If the distance between the third point is less than the defined minimum distance, then is assigned the reference coordinate of the centroid pixel of different null;

The fourth point of interest (1413) is calculated similarly to the first, but uses the bounding rectangle of the right eyebrow;

The fifth point of interest (1414) is obtained analogously to the second, but uses the bounding rectangle of the left eyebrow;

The sixth point of interest (1415) is calculated similarly to the third, but the scanning line is scanned from right to left.

After estimating the waypoints of the eyebrows, starts, then the process for obtaining the waypoints of the face (914). Points of interest obtained for the eyes and mouth are used to remove other parts of the face of user region of interest and serve as parameters for the method that estimates the waypoints of the face.

Figure 15:
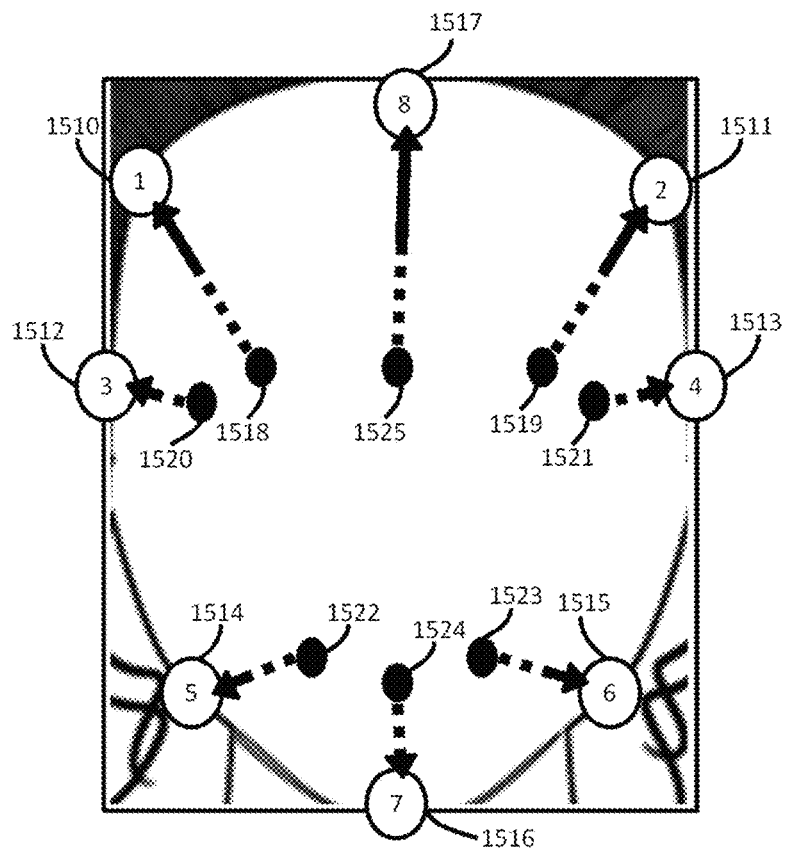
FIG. 15 shows the direction that moves the sliding window used in the search for points of interest of the mask of contour of the face.

Before starting the analysis of the image, it removes the region between the eyebrows and mouth, facilitating, in turn, the mapping of the face. Then apply the Sobel filter in horizontal and vertical direction in order to extract the edges of the face. To perform the search for points of interest was used a sliding window which moves according to the directions shown in FIG. 15. The coordinate of each point of interest corresponds to the position of the first window and the difference between its pixel is greater than a predefined threshold and which are located outside the region between the mouth and eyebrows. All points using basically the same method, changing only the parameters related to orientation and the reference point, which defines the orientation direction of the scanning line and the reference point determining the initial position of the scanning line. The following, the parameters used to estimate each point of interest of the face are described:

The first point of interest of the face (1510) has as a reference point of interest of the eye represented by 1518 and the guidance of its scanning line equals 150°;

The second point of interest of the face (1511) uses the eye point of interest, represented by 1519, as a reference and has a scanning line has the same direction at 60°;

The third point of interest of the face (1512) has as a reference point of interest of the eye represented by (1520) and its line scanning direction is equal to 170;

The fourth point of interest of the face (1513) uses as a reference point, the point of interest of the eye represented by (1521), where its scanning line has guidance of 10°;

The fifth point of interest of the face (1514) has as its reference point the point of interest of the mouth represented by (1522) and the orientation of its scanning line equals 200°;

The sixth point of interest of the face (1515) uses as a reference point, the point of interest of the mouth represented by (1523) and has a scanning line direction is equal to 340°;

The seventh point of interest of the face (1516) has as its reference point the point of interest of the mouth represented by (1524) and its scanning line has direction with 270°;

The point of interest of the eighth face (1517) is represent by the reference point (1525) corresponding to the distance between the center points of interest of the eye (1518) and (1519). The orientation of the scanning line from this point is 90°.

Aiming to improve the result of make-up, after obtaining all the points of interest regions face, starts the step of adjusting the points. In this step, the user must manually fix the position of the point estimate, if not in accordance with the wishes of the user.

Points of interest are used to form polygons that are connected by Bezier interpolation, and calculate the regions where the make-up will be applied. It is clear that the option of adopting the mechanism of Bezier interpolation concerns the need to tap into the points of interest masks using curved lines, as in real faces. This is done by simulating design applications vector connecting edges and vertices by using the Bezier interpolation to set the bending of these edges. The process of this invention is nonetheless a vectorizing parts of the face.

After finding all the points of interest begins the last stage of the process called "virtual make-up application" (512), which is the stage responsible for applying make-up in the regions of interest.

To make the application of make-up to the present invention uses the mapping of the fingers the user through the touch screen handheld. Hereby, it is possible to obtain the coordinates of the position that user played on the screen. Make-up is applied through the interaction of the user with the device, where, by touch and motion gestures to drag your finger across the region to be made up, to the user simulates the actual application of make-up. As the user slide your finger over the region that simulates the look, it increases the intensity of the selected color in the region made up.

The embodiment of the invention embodied as object of the present invention employs parallel processing techniques to make the processing of information necessary for the combination of skin color and the color of make-up products.

Thus, it is possible to trap the ring of the user on the screen process while other regions have been played, improving the outcome of the make-up and the usability of the application.

Each make-up product has different colors that can be combined, in addition to having different characteristics with regard to the mode of application on the face. Therefore, it is necessary to create masks that identify regions to be disguised for each product. The creation of these masks avoids the "blurring" of make-up in your application from the fingers of the user, and set the correct size of each region to be dressed up.

In general, the creation of the mask is performed by calculating the coordinate points (x, y). These points are obtained using the equation of the line where the slope is equal to the offset from the starting point.

Figure 16:
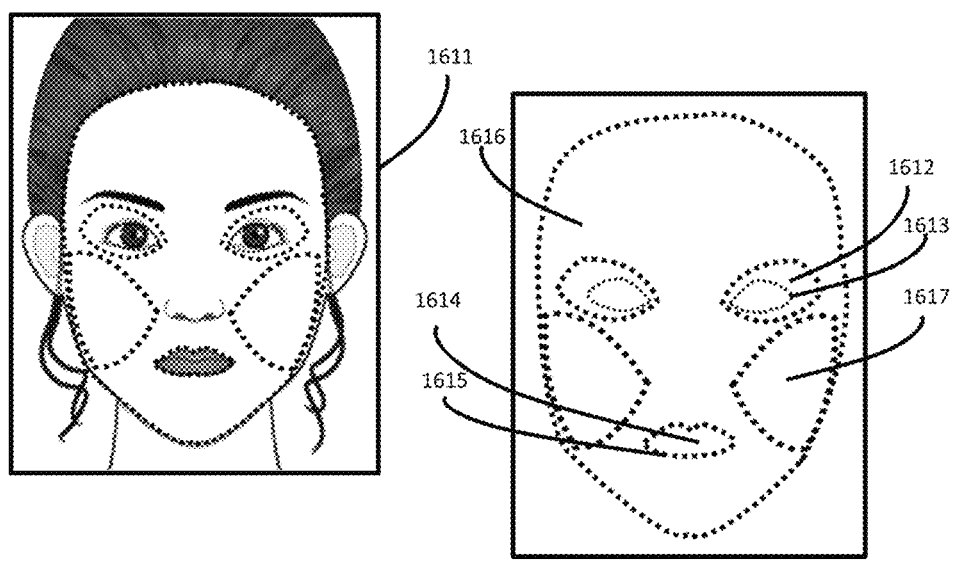
FIG. 16 shows the regions corresponding to the make-up products used in the preferred embodiment of the present invention.

The mapped regions correspond to products simulated by the present invention. These products are Shadow (1612), eyeliner (1613), Lipstick (1614), lip liner (1615), foundation (1616) and blush (1617). FIG. 16 shows the regions corresponding to the make-up products used among the preferred embodiments of the present invention.

Besides the mask that defines the region where the make-up is applied, the present invention creates another mask that represents the highest level of color intensity, which is nothing more than a threshold intensity of color that make-up can achieve. The masks that define maximum color intensity for each region/product are needed for the combination of skin tones and colors of make-up products does not become saturated and that the contours are smoothed disguised regions, showing a gradient that is present in the actual make-up.

Figure 17:
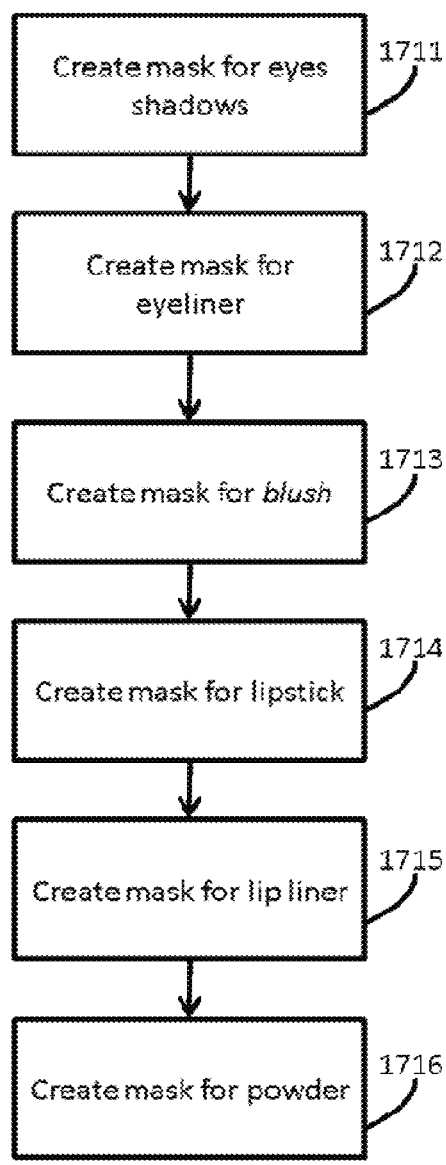
FIG. 17 shows the flow of creating masks for application of make-up products.
Figure 18:
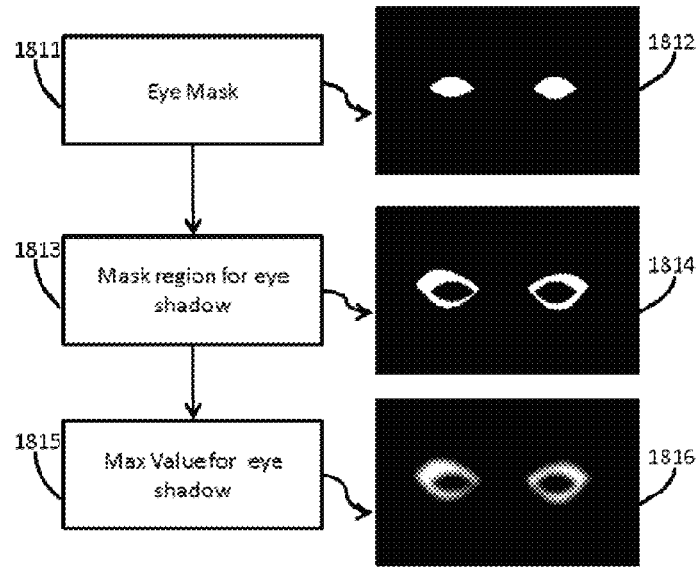
FIG. 18 illustrates the application of shadow masks for the eyes.

The masks used to carry out the make-up are created from the flow shown in FIG. 17. The first created masks are shadow (1713). For the purposes of the shadow are used three (3) masks: one represents the eye region and another region of the shadow application and the last maximum values of color intensity, as illustrated in FIG. 18. Eye Mask (1811) is created through the polygon formed by the interconnection points of interest in the eyes. These points are interconnected by means of Bezier interpolation, forming a smooth curve for each polygon edge, then, the interior of the polygon is filled out. The result is shown in 1812.

The mask of the shadow region (1813) is created similarly to the first, but the points (vertices) of the polygons that make up this mask are calculated from the points of interest obtained for the regions of eyes and eyebrows. In general, we calculate the displacement and orientation of points of entry to obtain the points of the mask. For the mask used in the application of eye shadow, are used as input for seven (7) reference points.

Figure 19:
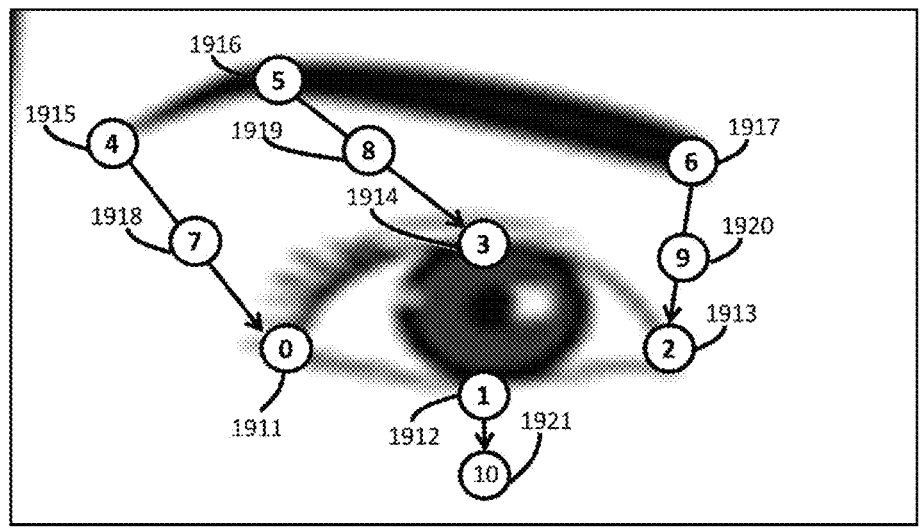
FIG. 19 shows the reference points and the points used for the creation of shadow masks for the left eye.

The shadow mask introduces each eye 4 (four) points (vertices) that are obtained from 3 (three) points on the brow and four (4) of the eye, the right or left side. The points of eye shadow mask, items 7 (1918), 8 (1919), 9 (1920), 10 (1921) are obtained from the waypoints of the contour of the eye, represented by points 0 (1911), 1 (1912), 2 (1913) and third (1914), and the sights of the eyebrow, represented by four points (1915), 5 (1916) and 6 (1915). FIG. 19 illustrates the first step to obtain the points necessary to calculate the shadow mask of the left eye.

Figure 20:
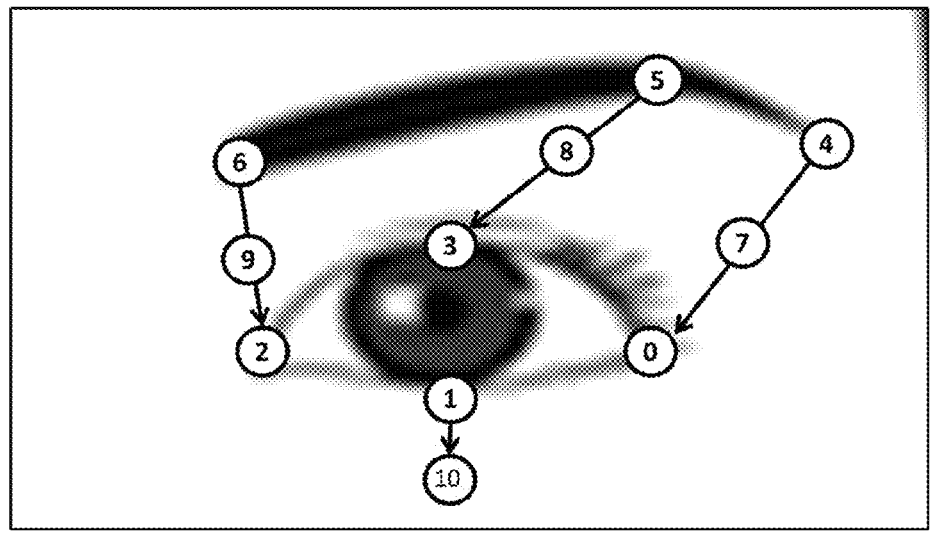
FIG. 20 shows the reference points and the points used for the creation of masks for the shadow of the right eye.

At this step, the points are obtained from the starting point and the displacement:
point 7 has as its starting point to point 4 and the offset is 30% difference between the point 0 and point 4;
point 8 has at its initial point and the offset is 5 40% difference between the point 5 and the third point;
The point 9 has a starting point to point 6 and the displacement is equal to 60% of the difference between the point 6 and the point 2;
The point 10 has a beginning point and the offset is 50% of the height of the eye.
Next, calculate the slope of the points:
Point 7 has slope $9\pi/8$;
Point 8 has a slope of $5\pi/4$;
Point 9 has a slope of $-\pi/8$, and
Point 10 has an inclination of $5\pi/8$.
These procedures are necessary to calculate the points of the shadow mask of the left eye. To calculate the right eye is carried out the same procedure, but the points are arranged symmetrically as a mirror as illustrated in FIG. 20.

The orientation of the slope of the points is also inversely symmetrical. For the right eye:
Point 7 has slope of $-\pi/8$;
Point 8 has slope $7\pi/4$;
Point 9 has a slope of $9\pi/8$, and
Point 10 has an inclination of $3\pi/8$.

The obtained points are interconnected and the whole interior of the polygons obtained is filled in the application of shadow, except the part corresponding to the contours of the eyes. The result is shown in 1814.

The third mask is the result of applying the Gaussian filter to the second mask, which has the effect of smoothing the outline of the shadow mask and the application is illustrated in 1816.

The method provides flexibility, since it makes it possible to provide the user the experience of mixing colors on the application of a product, plus the ability to adopt different strategies in the application of different shadow colors to different regions of the eyes, enriching the usability of the application.

The mask for application of eyeliner (1712) is created similarly to the eye shadow mask. The application of eyeliner is intended to enhance the contour of the eye. To create the mask of eyeliner calculates the displacement of the points to form the region corresponding to its potential application as it is for the user decide what segment of the application area you want to dress up (contour of the upper eyelid, the lower, outer or inner corner of the eye).

Figure 21:
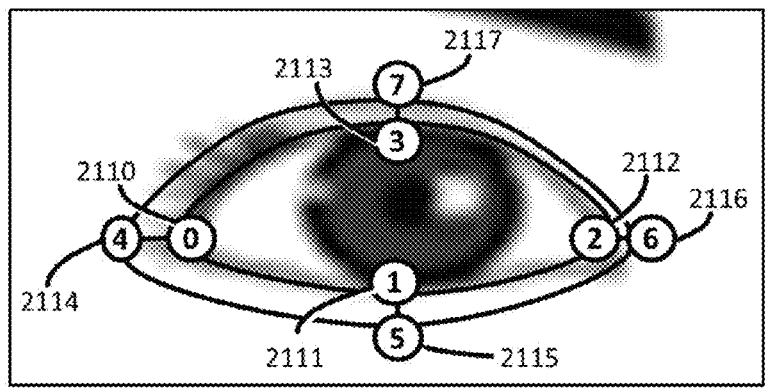
FIG. 21 shows the reference points and the points used for the creation of masks for the eyeliner of the left eye.

FIG. 21 illustrates the points used to create the mask left eye pencils. 0 points (2110), 1 (2111), 2 (2112) and 3 (2113) are the points of interest of the eye. Items 4 (2114), 5 (2115), 6 (2116) and 7 (2117) are used in creating the mask eyeliner and their coordinates are obtained from the displacement of the landmarks of the eye:
Point 4 has coordinates equal to the sum of the coordinates of point 0 most 10% of the width of the eye;
Point 5 has coordinates equal to the sum of the coordinates of a point over 10% of the height of the eye;
Point 6 has coordinates equal to the sum of the coordinates of the two most 5% of the width of the eye;
Point 7 has coordinates equal to the sum of the coordinates of point 3 plus 10% of the height of the eye.
Then the points 4, 5, 6 and 7 are interconnected according to the Bezier interpolation, forming a polygon of curved edge. The region bounded by this polygon externally and internally by the polygon formed by points of interest that define the contour of the eye is the region of application of eyeliner.

The mask of eyeliner of the right eye is obtained in a similar manner, but the points are symmetrical inverted from the left eye.

Figure 22:
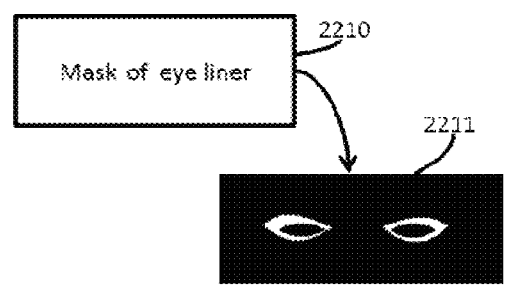
FIG. 22 shows the mask for application of eyeliner.

The fingertip defines the region of effective application of eyeliner, then apply a filter to smooth the edges of the dash, making it closer to the effect obtained with a real make-up. The filter used is the Gaussian again, but with a small size (3×3). FIG. 22 shows the masks required for application of eyeliner, where 2211 is the final mask used.

Then, it begins the procedure that creates shade for the lipstick (1713). For applying lipstick need only a mask that defines its region, it is possible to map the touch of your fingers and set the maximum level of shade to be applied with a single mask. This mask is created using the points of interest obtained by reference to the mouth. Starting from the points of interest of the mouth creates a polygon corresponding to the interconnection points by interpolation Bezier curves for drawing the contour of the mouth.

Figure 23:
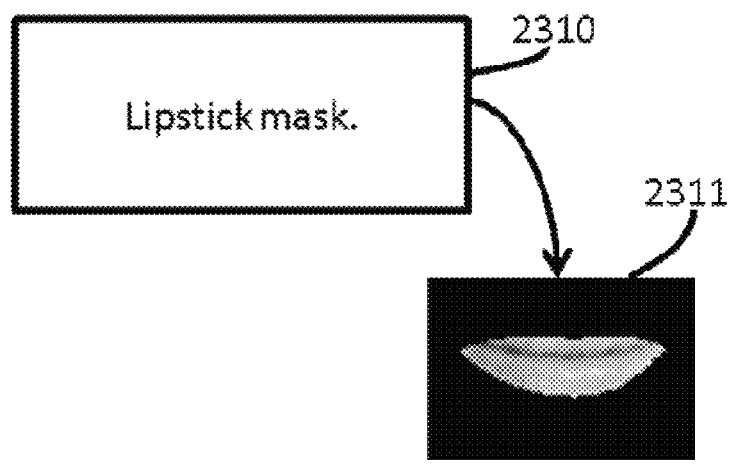
FIG. 23 shows the mask for application of lipstick.

It is also make reference to the gray levels of pixels making up the lips, which will define the maximum levels of intensity of lipstick, allowing the use of a single mask to the application. FIG. 23 illustrates the mask used for applying lipstick, where 2311 is the mouth area with the gray levels used to define the maximum level of shade.

To create the mask for applying the pencil Mouth (1714), points of interest to the contour of the mouth are interconnected using Bezier interpolation. The line joining the points has a thickness which corresponds to the thickness of the pencil generic real mouth.

Figure 24:
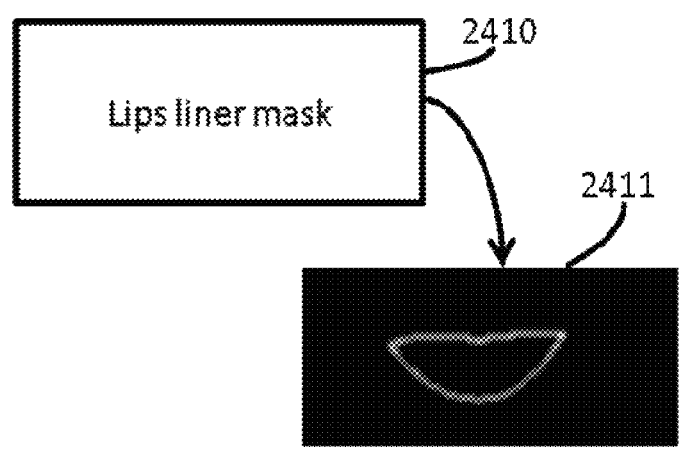
FIG. 24 shows the mask for application of lip liner.

Similarly to eyeliner, the contours of the mask pencil mouth are smoothed using Gaussian filter. FIG. 24 illustrates the mouth mask pencil represented by 2411.

The eyeliner and the lid liner and using the same mechanism of mapping the mask to the touch the user and to set the maximum application of color tones.

Figure 25:
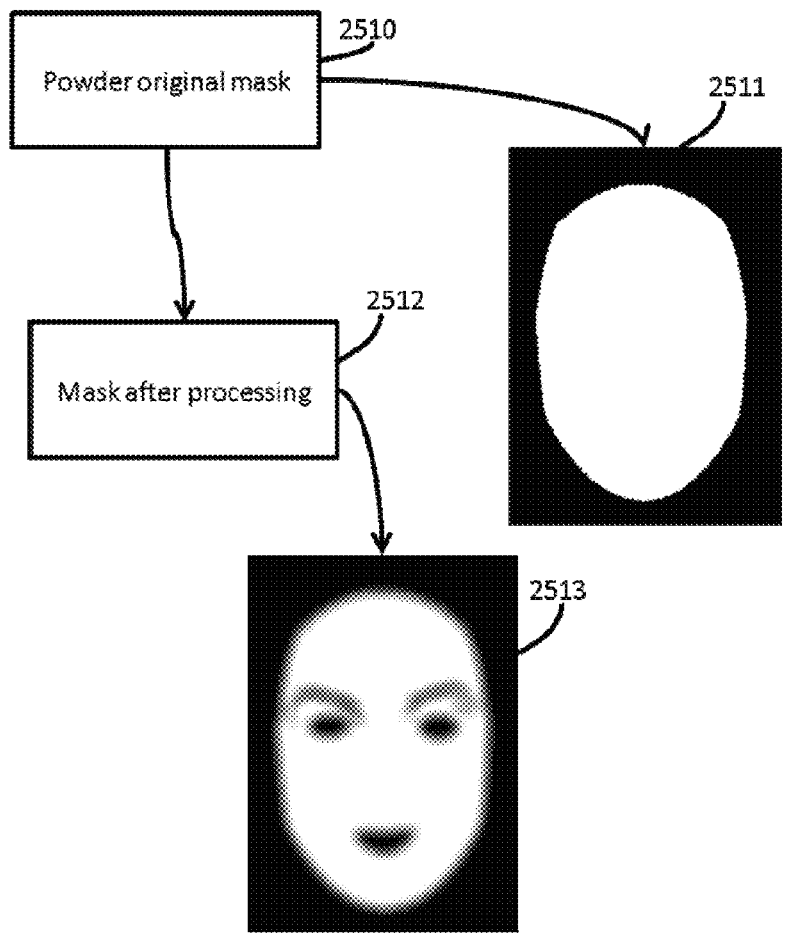
FIG. 25 illustrates a mask used in obtaining the foundation application.

The following procedure describes the creation of the mask to the foundation (1714). The mask used for implementation of the considered base points on the face forming a polygon corresponding to the boundary region of the face, as shown in FIG. 25. The polygon is created by linking the points on the face with curved lines resulting Bezier interpolation and is represented by 2511. The application of the foundation corresponds to the region to fill the polygon, which are removed from the regions of the mouth, eyes and eyebrows.

That is, to create the foundation mask, we consider the positions of points of interest of the eyes and mouth, but ignore the pixels corresponding to the same regions as the regions of eyes and mouth are eliminated from the mask application foundation, making it necessary to perform processing in the region of the face mask to create the foundation (2112). The regions of the eyes and mouth are removed by mapping their location through the points of interest that define its contours. To remove the eyebrows, maps to the location of these through its points of interest, but the points of interest form line of the eyebrows and not polygons. Then, it maps the region around the line formed by points of interest, distinguishing what is and what skin is eyebrow. This is done using a technique that calculates the adaptive digitalization threshold that separates the pixels of skin tones and eyebrows. Then, again it applies the Gaussian smoothing the edges of the mask, as shown in 2513. This mask is used to map the touch of the user and define the maximum level of application of color shades.

The latest masks are created in the region of blush (1716). The blush is mapped in the region of the cheekbones (zygomatic bones on the region and just below them). For the application of regions of blush, it is necessary to estimate three (3) reference points on each side of the face.

Figure 26:
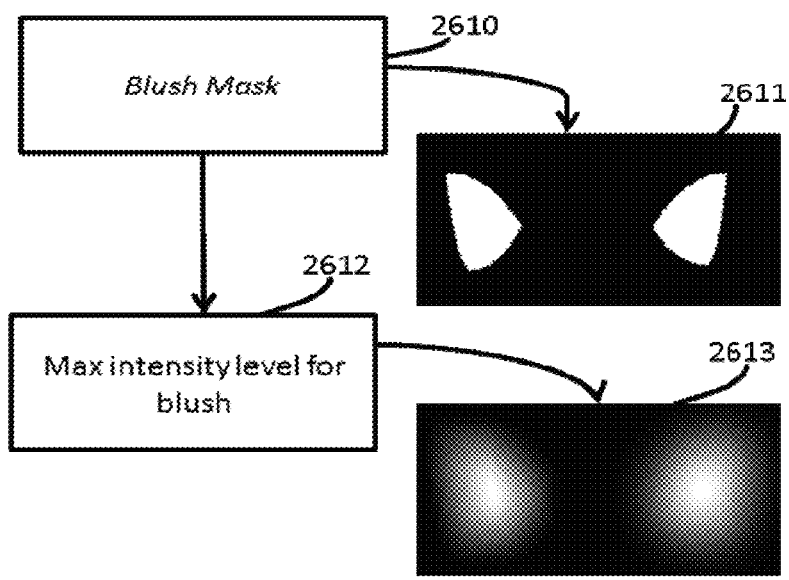
FIG. 26 shows the masks used in the application of blush.
Figure 27:
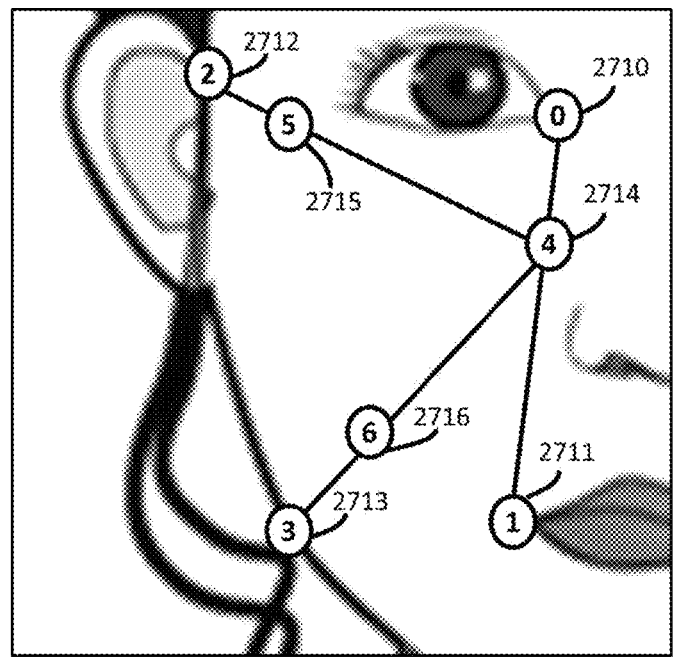
FIG. 27 shows the reference points and the points used for the creation of masks for applying blush on the left side of the face.
Figure 28:
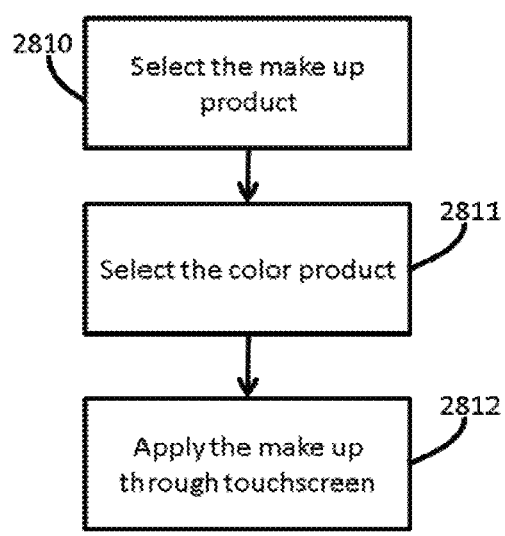
FIG. 28 shows the flow used for application of make-up.

FIG. 26 shows the masks necessary for applying blush. The method of production of these masks is similar to how the masks are obtained from eye shadows. To obtain it, first calculate the offset between the reference points. FIG. 27 illustrates the points of reference for the application of the mask blush on the left side of her face. Points of interest 0 (2710), 1 (2711), 2 (2712) and 3 (2713) are used as a reference to calculate the points 4 (2714), 5 (2715) and 6 (2716), which define the mask application of blush. The following is described how the mask is obtained pursuant to blush:

point 4 is obtained as follows: calculate the vertical distance between points 0 and 1, which are points of interest the eye and mouth (the inner corner and outer corner of the mouth) and applies a displacement equivalent 40% of this distance from the starting point (point 0);

Coordinates of the point 5 is calculated using as a reference point 2, which is a point of interest to the contour of the face and the point 4 obtained above. Point 5 undergoes a displacement relative to the second point 10% of the distance between points 2 and 4;

point 6 is calculated similarly to point 5. Its coordinates are calculated from point 3, which is another point of interest to the contour of the face. Item 6 undergoes a displacement relative to the third point 10% of the distance between the points 3 and 4;

Point 4, 5 and 6 are interconnected using Bezier interpolation, a polygon that is the mask to be filled in the application of blush.

The method described is used to create the mask blush on the left side face, and the mask for the right side of the face is obtained in the same way, but the points are symmetrical inverted in relation to the left.

The mask that defines the maximum levels of intensity of application of make-up is obtained by applying a Gaussian filter on the mask application. The filter size is equal to the dimension of the largest side of the polygon obtained. The resulting masks are shown in FIG. 26, where 2611 is used to map the users touch 2613 and stores the values of maximum intensity levels for blush.

After obtaining all the masks, it is possible to simulate the make-up and in turn mapping the region of each product and avoid the "blurring" and "saturation" of the region made up. The masks are used as parameters to functions that perform the application of make-up.

The last step of make-up is the interaction of the user with the mobile device for simulating the process of applying make-up itself. To execute this process, the user selects the desired product (2810), the color of the product (2811) and then through the touchscreen gestures and movement, carries the paint in the region of the face (2812) in which to apply make-up.

Figure 29:
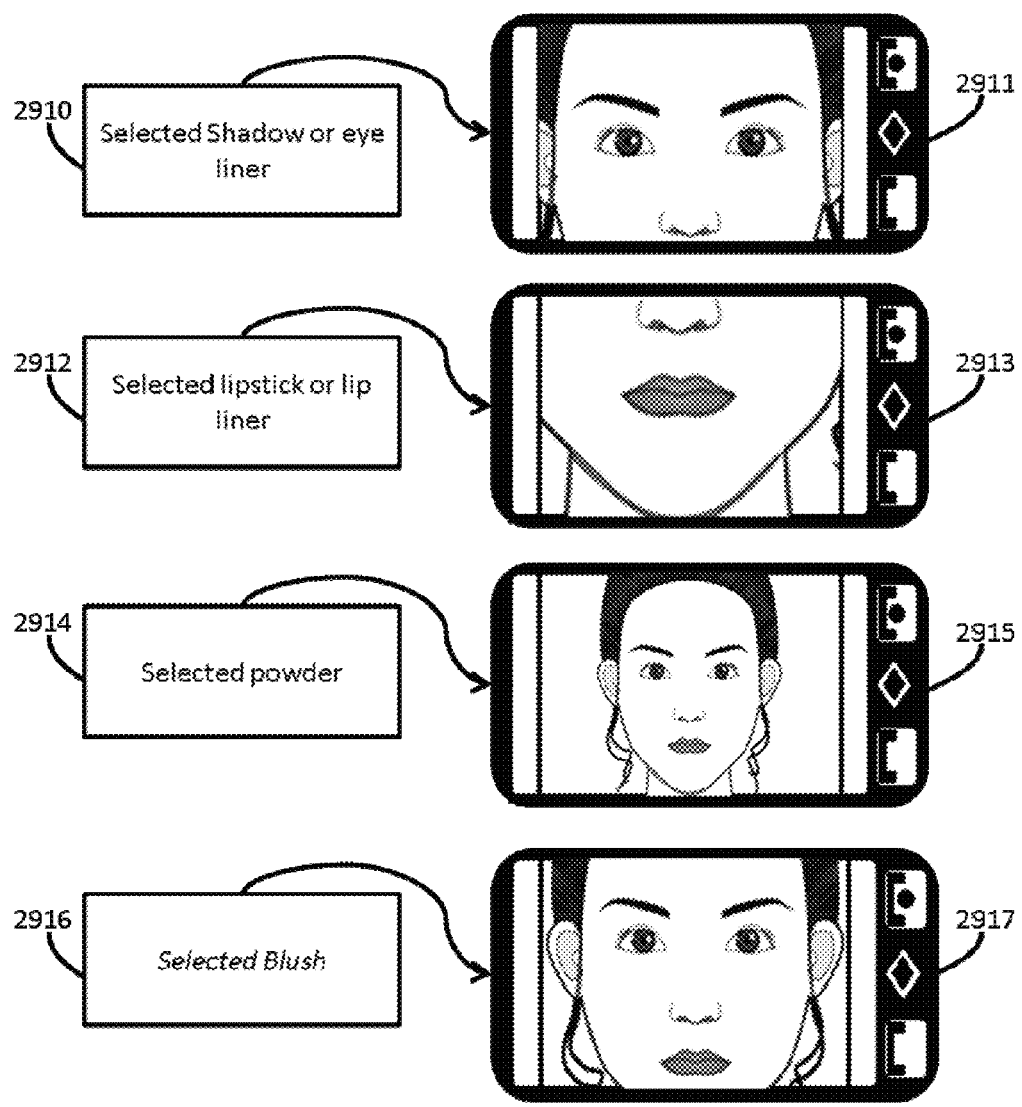
FIG. 29 shows the selection of the products used in the present invention.

Each product make-up is responsible for coloring a particular region of the face the user. Seeking to get featured on the region of the selected product, the present invention performs an approximation in this region, highlighting the selected product. The approach to be made up of the region also improved the usability of the coloring make-up, because it increased the area of the ring the user for applying the make-up. FIG. 29 illustrates the result in the display of the mobile device of selecting each product.

After selecting the product and its color, the user must swipe in the area you want to make up by the touch screen so that the make-up is applied.

In general, the interception of touch is performed by the user interrupt controlled by the operating system of the mobile device. In turn, the operating system places the result of this operation in its event queue that is consumed in the main thread of the current application. So, when it performs some processing that can consume a considerable portion of the computational time, many events can be lost, making the outcome of the procedure is harmed. An example of this is that when the user is making coloring make-up through the touch screen is necessary to intercept finger placement on the screen. If after interception be a very time-consuming procedure computing, many points will be lost, since the event queue can only be consumed after completion of this procedure.

The procedure described by the present invention performs all the processing performed to carry out the make-up in a separate thread, releasing the main thread so that it can consume the events. In this moment is that touch is intercepted, captured the position of this and stores it in a queue that is used by the thread that makes the coloring make-up.

In general, the coloring of the region to be dressed up starts when it detects movement of the user on the screen of the mobile device. This happens when at least 2 (two) points are intercepted, beginning the process that performs a combination of skin color and the color of the product application simulating a real make-up.

The procedures used to perform the make-up of each product are performed similarly.

Figure 30:
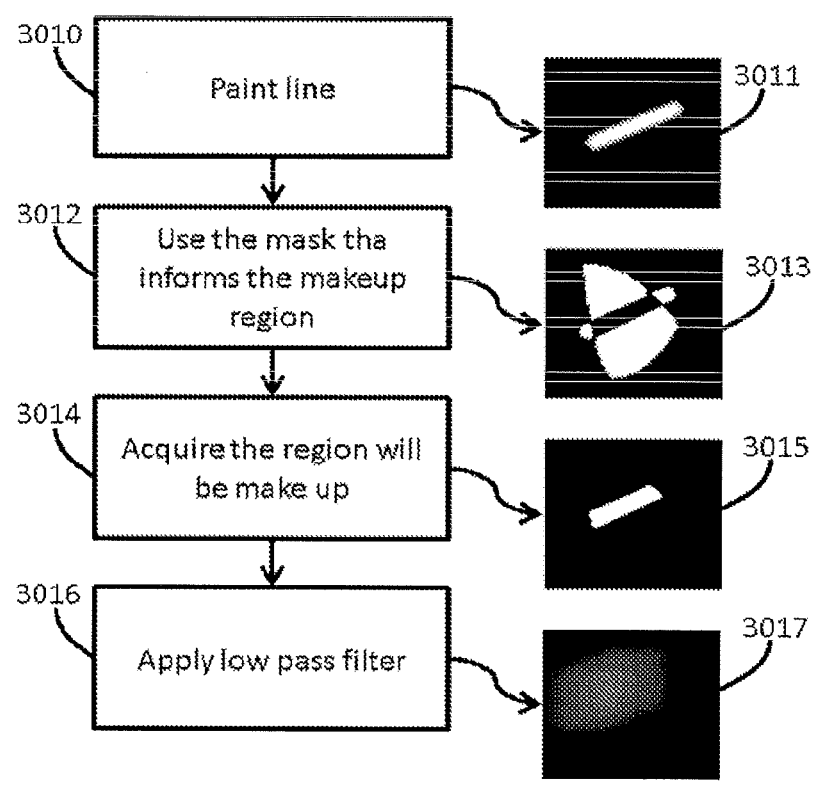
FIG. 30 shows the procedure used to create the mask in the region to be made up.

One of the steps used for all products is the creation of the coloring line. This line is a small mask that defines which pixels are combined with the skin color of the selected product. The process for creating the line of paint is described by the flow shown in FIG. 30. To start the step of coloring the make-up you need at least points, where these amount to the position of the finger user touch screen mobile device. When user start coloring the make-up, the procedure will build the coloring lines (3010) from each two points. An example of the coloring line is shown constructed in 3011. The first line will have as starting point the initial position of the touch user. The other lines will have as a starting point the end point of the previous line.

Each make-up product uses different tools to perform the face coloring. For example: The blush brush is wider than the brush used to apply eye shadow. Due to this the user's touch with the blush will have a greater thickness than the touch of eye shadow. Therefore, each product has different thicknesses for your coloring line.

The procedure should make the coloring make-up only in the region of the selected product. So, before making the combination of colors you need to check if the paint line corresponds only to the region defined by the selected product. To perform this check masks are used which have been previously created (3012). This step will keep only the pixels that belong to the paint line and the mask of the selected product. At 3013, it is shown the relationship between the mask and the coloring line. A new coloring line is created (3014) and this shows the valid region to perform the coloring. At 3015, it illustrates the result of the line after removing the bad pixels.

To simulate the application of make-up is necessary to apply a low pass filter to soften the line and decrease the values of the pixels of the line paint (3016). Then, it applies the Gaussian filter to blur the coloring line, creating a mask in the region to be colored. The result is presented at 3017 and this is used by the procedure that matches the color of the product and the skin of the face to simulate the make-up. The size of the convolution window and the level of blurring (sigma) of the Gaussian filter is different for each type of product for simulating the effect is similar to the effect of application of the actual product.

The procedure that effectively simulate the make-up of the face uses the image of the face, the mask with the highest levels of intensity, the mask of the region to be painted and an accumulator, whose features are described below:

The image of the face matches the photo captured by digital camera of the mobile device. The make-up of the simulation is performed on this image, which in turn is used as a parameter input and output of the procedure carries out the application of make-up.

The mask with the highest levels of intensity defines the maximum product in which color can reach, so that the combination of skin color and the product does not become saturated without allowing the color to be opaque and making it present an effect similar to the real application of make-up.

The region of the mask to be colored sets the color and intensity of the pixels that will be painted.

An element that is an accumulator array of the size of the input image, which saves the current intensity of make-up. Each time the user interacts with the mobile device via the touch screen, the procedure for carrying out the coloring is started and the region of make-up that was played will be painted and the color intensity current is increased in the accumulator. If the pixel value of the accumulator plus the current color depth is greater than the corresponding value in the mask with the highest levels of intensity, then the combination of the product color and skin color will not be made for this pixel.

$$I(x, y) = \frac{(255 - A(x, y)) \times I(x, y) + A(x, y) \times cor}{255} \quad (9)$$

Equation (9) has the formula used to match the color of the skin color of the producer. The matrix I(x, y) is the face image and the matrix A (x, y) corresponds to the region to be made up, and this has the color intensity of each pixel. The color is variable corresponds to the color of the selected product.

At any time of the simulation process of make-up application offers the possibility to compare the effect "before" and "after" the application of make-up, as well as the option to remove it.

When the user considers completed and satisfactory simulation of make-up, the application allows the image of the made-up face is saved to the device or shared via bluetooth, email or social networks. If s/he does not like the result, the user has the options to restart the process or simply to eliminate the final image.

Although a preferred embodiment of the present invention is shown and described, those skilled in the art will understand that various modifications can be made without departing from the scope and spirit of the present invention as defined in the appended claims.

It is explicitly mentioned that also all combinations of elements that perform the same function in substantially the same way to achieve the same results are within the scope of the invention.

The invention claimed is:

1. A method for simulating make-up on a face of a user on a portable device equipped with a digital camera, the method comprising:
    finding, by a processor, the face and constituent parts of the face;
    segmenting regions of the face;
    searching for points of interest in the regions of the face;
    creating masks to delimit the regions;
    receiving a gesture, by a finger of the user, to apply make-up to the masked regions;
    avoiding blurring of the region with applied make-up; and
    matching colors of the face with the make-up applied to provide a realistic effect to the applied make-up,
    wherein the make-up is applied by an interaction of the user with the device, where, by touch and motion gestures of dragging his/her finger across a region where the make-up is applied, the user simulates an actual application of the make-up in that as the user passes the finger over the region, an intensity of a selected color of the make-up in the region is increased.

2. The method of claim 1, wherein the segmenting the regions of the face comprises:
    cutting a target region that includes only the face by selecting a rectangle corresponding to the target and copying pixels in the rectangle to a new image; and finding an eye region and a mouth region of the user in the new image.

3. The method of claim 2, further comprising converting the image from an RGB color space to a YIQ color space, wherein component Y stores luminance information, and components I and Q store chrominance information.

4. The method of claim 3, wherein the finding the mouth region comprises analyzing the pixels of the Q channel because of the difference between the face color and a color of the mouth.

5. The method of claim 2, wherein the mouth region is found by creating a binary mask which separates the mouth from the rest of the new image.

6. The method of claim 1, further comprising adjusting points, in which the user manually corrects a position of the points of interest.

7. The method of claim 1, wherein the user modifies lines delimiting the delimited regions of the face.

8. The method of claim 1, wherein the user selects one of several styles of make-up reflected in color palettes of products to be applied on the face.

9. The method of claim 1, wherein the user defines a position and intensity of colors for different make-up products.

10. The method of claim 1, wherein the user can switch between an image of the face without make-up and an image of the face with the applied make-up for comparison, and remove the applied make-up.

11. The method as claim 1, wherein an image of the face with the applied make-up may be stored locally on the device or shared.

12. A system for simulation of applying make-up on a portable device equipped with a digital camera and a touch screen, the system comprising:
   the digital camera capturing an image in a real-time preview mode;
   for a storage unit storing information and data including color palettes of products used in make-up and photos with applied make-up;
   an information input device intercepting keyboard events and a touch of a user on the touch screen;
   an audio component capturing and reproducing sound;
   a connectivity component connecting remote services including social networks and email, and
   a display displaying data and images presented with make-up applied by the portable device,
   wherein the make-up is applied by an interaction of the user with the device, where, by touch and motion gestures of dragging his/her finger across a region where the make-up is applied, the user simulates an actual application of the make-up in that as the user passes the finger over the region, an intensity of a selected color of the make-up in the region is increased.

13. The system of claim 12, wherein with the digital camera comprises two cameras, one front and one rear, wherein the front camera has a higher quality.

14. The system of claim 12, wherein the make-up is applied by mapping a finger of the user on the touch screen of the portable device.

15. The system of claim 12, wherein masks identifying regions being made-up for each product are provided.

16. The system of claim 15, wherein the masks prevent a blurring of the applied make-up, and set a size of each region being made up.

17. The system of claim 15, wherein the regions corresponding to simulated make-up products comprise a shadow, eyeliner, lipstick, lip liner, foundation, and blush.

18. The system of claim 15, further comprising a mask that represents a maximum level of color intensity representing a maximum intensity of make-up color that can be achieved.

19. The system of claim 12, wherein each product uses different make-up tools.

* * * * *

UNITED STATES PATENT AND TRADEMARK OFFICE
CERTIFICATE OF CORRECTION

PATENT NO. : 8,908,904 B2
APPLICATION NO. : 13/338554
DATED : December 9, 2014
INVENTOR(S) : Santos et al.

Page 1 of 1

It is certified that error appears in the above-identified patent and that said Letters Patent is hereby corrected as shown below:

In the Claims

Column 23, line 29, Claim 11, delete "as claim" and insert -- of claim --, therefor.

Signed and Sealed this
Thirtieth Day of June, 2015

Michelle K. Lee
*Director of the United States Patent and Trademark Office*